US008568236B2

(12) United States Patent
Baray et al.

(10) Patent No.: US 8,568,236 B2
(45) Date of Patent: Oct. 29, 2013

(54) FANTASY SPORTS AGENT

(75) Inventors: Cristobal Baray, Sunnyvale, CA (US);
Shawn Robinson, San Jose, CA (US);
Chuck Riess, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1061 days.

(21) Appl. No.: 11/495,074

(22) Filed: Jul. 28, 2006

(65) Prior Publication Data

US 2008/0026804 A1 Jan. 31, 2008

(51) Int. Cl.
*A63F 13/00* (2006.01)
*A63F 9/24* (2006.01)

(52) U.S. Cl.
USPC .............. 463/42; 463/4; 463/40; 700/91

(58) Field of Classification Search
USPC .................... 463/9, 40, 42; 700/91
See application file for complete search history.

(56) References Cited

U.S. PATENT DOCUMENTS

| 5,263,723 | A | * | 11/1993 | Pearson et al. ............ 463/41 |
| 5,583,763 | A |   | 12/1996 | Atcheson et al. |
| 5,771,378 | A |   | 6/1998  | Holt et al. |
| 5,971,854 | A | * | 10/1999 | Pearson et al. ............ 463/41 |
| 6,169,992 | B1 |  | 1/2001  | Beall et al. |
| 6,327,590 | B1 |  | 12/2001 | Chidlovskii et al. |
| 6,371,855 | B1 | * | 4/2002 | Gavriloff ................. 463/42 |
| 6,446,065 | B1 |  | 9/2002  | Nishioka et al. |
| 6,687,734 | B1 |  | 2/2004  | Sellink et al. |
| 6,701,311 | B2 |  | 3/2004  | Biebesheimer et al. |
| 6,785,670 | B1 |  | 8/2004  | Chiang et al. |
| 6,789,073 | B1 |  | 9/2004  | Lunenfeld |
| 6,822,650 | B1 |  | 11/2004 | Davis et al. |
| 6,961,731 | B2 |  | 11/2005 | Holbrook |
| 7,050,868 | B1 |  | 5/2006  | Graepel et al. |
| 7,058,626 | B1 |  | 6/2006  | Pan et al. |
| 7,762,878 | B2 | * | 7/2010 | Nicholas et al. ............. 463/4 |
| 7,867,080 | B2 |  | 1/2011  | Nicely et al. |
| 2002/0062247 | A1 |  | 5/2002 | Allen |
| 2002/0107073 | A1 |  | 8/2002 | Binney |
| 2003/0054885 | A1 | * | 3/2003 | Pinto et al. ................. 463/42 |

(Continued)

OTHER PUBLICATIONS

Fantasy Football Lineup Analyzer—Tips for Who to Start & Who to Bench each Week [online], Jul. 17, 2006 [retrieved on Feb. 10, 2009]. Retrieved from the Internet:< URL: http://web.archive.org/web/20060717163529/www.fantasyfootballstarters.com/lineupAnalyzer.jsp>.*

(Continued)

*Primary Examiner* — Dmitry Suhol
*Assistant Examiner* — Ryan Hsu
(74) *Attorney, Agent, or Firm* — James J. DeCarlo; Greenberg Traurig, LLP

(57) ABSTRACT

A fantasy sports alert agent provides notifications of relevant news articles and occurrences in a fantasy sports game, such as fantasy team roster changes or player trades, and also suggests changes to a fantasy team roster to improve the team's chances of winning. The notifications are based on items of data received from an item generator, which is typically a server process that communicates with the agent via a network. The alert agent may suggest alternative fantasy team roster lineups and, if the user accepts a suggestion, the agent may change the lineup. Each notification includes a call to action feature, such as a web link, which a user can select to perform an action, such as accepting a trade or changing the team's roster. The notifications may be displayed on a user's computer screen by the alert agent, or by an RSS reader or electronic mail reader.

33 Claims, 24 Drawing Sheets

(56) References Cited

U.S. PATENT DOCUMENTS

| | | | |
|---|---|---|---|
| 2003/0203757 A1* | 10/2003 | Chanda et al. | 463/42 |
| 2004/0025180 A1 | 2/2004 | Begeja et al. | |
| 2004/0110552 A1* | 6/2004 | Del Prado | 463/4 |
| 2004/0122892 A1* | 6/2004 | Brittenham et al. | 709/203 |
| 2004/0266530 A1* | 12/2004 | Bishop | 463/42 |
| 2005/0001837 A1 | 1/2005 | Shannon | |
| 2005/0050022 A1* | 3/2005 | Dukes et al. | 707/3 |
| 2005/0159220 A1* | 7/2005 | Wilson et al. | 463/40 |
| 2005/0160080 A1 | 7/2005 | Dawson | |
| 2006/0026013 A1 | 2/2006 | Kraft | |
| 2006/0040719 A1* | 2/2006 | Plimi | 463/9 |
| 2006/0046807 A1* | 3/2006 | Sanchez | 463/9 |
| 2006/0064184 A1* | 3/2006 | Ream et al. | 700/91 |
| 2006/0074853 A1 | 4/2006 | Liu et al. | |
| 2006/0183548 A1* | 8/2006 | Morris et al. | 463/42 |
| 2006/0217198 A1* | 9/2006 | Johnson | 463/40 |
| 2006/0252476 A1* | 11/2006 | Bahou | 463/4 |
| 2006/0258421 A1 | 11/2006 | Nicholas et al. | |
| 2006/0288845 A1 | 12/2006 | Gale | |
| 2007/0113250 A1* | 5/2007 | Logan et al. | 725/46 |
| 2007/0157595 A1 | 7/2007 | Lockwood | |
| 2007/0162850 A1* | 7/2007 | Adler et al. | 715/700 |
| 2007/0185599 A1* | 8/2007 | Robinson et al. | 700/92 |
| 2007/0191110 A1 | 8/2007 | Crouse | |
| 2007/0203591 A1* | 8/2007 | Bowerman | 700/90 |
| 2007/0233585 A1* | 10/2007 | Simon et al. | 705/35 |
| 2007/0245241 A1 | 10/2007 | Bertram et al. | |
| 2008/0096664 A1 | 4/2008 | Baray et al. | |
| 2008/0102911 A1 | 5/2008 | Campbell et al. | |
| 2008/0153589 A1 | 6/2008 | Baray et al. | |
| 2008/0155436 A1 | 6/2008 | Hirano et al. | |

OTHER PUBLICATIONS

MyFantasyLeague Fantasy Football League Management—Features [online], Jul. 16, 2006 [retrieved on Feb. 10, 2009]. Retrieved from the Internet< URL: http://web.archive.org/web/20060716072900/www.myfantasyleague.com/features.htm>.*

Unknown, "Draft Coach: A First in Fantasy Football" Jul. 8, 2003 retrived from Internet on Nov. 19, 2011, www.fantasysharks.com.*

"MyFantasyLeague.com 2005 Help Manual", Aug. 23, 2005, Sideline Software Inc.*

Sansbury, C. (Sep. 13, 2005). "Yahoo! Widget for BBC Sports News—Scotland," located at <http://widgets.yahoo.com/gallery/view.php?widget=37220>, last visited on Nov. 13, 2006, one page.

Yahoo! Inc. (Dec. 7, 2005). "Yahoo! Widget Engine 3.0 Reference Manual Version 3.0," 299 pages.

Almieda, R.B. at al. (2004). "A Community-Aware Search Engine," *WWW2004*, New York., NY, May 17-22, 2004, pp. 413-421.

Bharat, K. (Date Unknown). "SearchPad: Explicit Capture of Search Context to Support Web Search," located at <http://www9.org/w9cdrom/173/173.html>, last visited Aug. 1, 2007, 13 pages.

Budzik, J. et al. (2000). "User Interactions with Everyday Applications as Context for Just-in-Time Information Access," *Proceeding of the 2000 Conference on Intelligent User Interfaces*, eight pages.

Finkelstein, L. et al. (2001). "Placing Search in Context: The Concept Revisited," *WWW10*, Hong Kong, May 2-5, 2001, pp. 406-414.

Freyne, J. at al. (2004). "Further Experiments on Collaborative Ranking in Community-Based Web Search," *Artificial Intelligence Review*, pp. 1-23.

Lieberman, H. (1995) "Letizia: An Agent that Assists Web Browsing," *Proceedings of the Fourteenth International Joint Conference on Artificial Intelligence*, Aug. 20-25, 1995, six pages.

Mitra, M. et al. (1998). "Improving Automatic Query Expansion," *Proceedings of the AMC SIGIR*, nine pages.

Rhodes, B.J. et al. (1996). "Remembrance Agent: A Continuously Running Automated Information Retrieval System," *Proceedings of the First International Conference on the Practical Application of Intelligent Agents and Multi Agent Technology (PAAM)*, pp. 487-495, located at <http://www.cc.gatech.edu/fac/Thad.Starner/p/032_40_agents&ubicomp/remembrance-agent...>, last visited Aug. 1, 2007, six pages.

U.S. Appl. No. 11/347,517, filed Feb. 3, 2006 for Robinson et al.

U.S. Appl. No. 11/495,087, filed Jul. 28, 2006 for Baray et al.

Kinetikos.com (2005), "Kinetiko's Graphical Standings for Major League Baseball 2005" http://patmedia.net/tmoy/super-graph/Mlb2005season.html, retrieved Oct. 16, 2007, 3 pgs.

Kinetikos.com (2005), "Major League Baseball Playoff Picture 2005" http://patmedia.net/tmoy/super-graph/Mlb2005playoff.html, retrieved Oct. 16, 2007, 3 pgs.

Kinetikos.com (2005), "Understanding Sports Super Graphs: Step 1—The Basics" http://patmedia.net/tmoy/super-graph/spexp1.html, retrieved Oct. 16, 2007, 2 pgs.

Kinetikos.com (2005), "Understanding Sports Super Graphs: Step 2—Ranges" http://patmedia.net/tmoy/super-graph/spexp2.html, retrieved Oct. 16, 2007, 2 pgs.

Kinetikos.com (2005), "Understanding Sports Super Graphs: Step 3—Time" http://patmedia.net/tmoy/super-graph/spexp3.html, retrieved Oct. 16, 2007, 2 pgs.

Kinetikos.com (2005), "Kinetiko's Graphical Standings for Major League Baseball 2005" http://patmedia.net/tmoy/super-graph/Mlb2005season.html, retrieved Nov. 21, 2006, 6 pgs.

MyFantasyLeague.com 2005 Help Manual, published by Sideline Software Inc. on Aug. 23, 2005 http://web.archive.org/web/20050910080106/http://www.myfantasyleague.com/help/mfl2005.pdf.

"Draft Coach: A First in Fantasy Football" article written by Tony Holm, published on Jul. 8, 2003 http://www.fantasysharks.com/artman2/publish/Draft_Coach_A_first_in_Fantasy_Football_70.htm.

"FAQ" published by Fantasy Football League Manager—CBS SportsLine.com on Dec. 11, 2005 http://web.archive.org/web/20051211092739/football.sportsline.com/splash/football/spln/mdmt/faq.

"PuppyWar" by puppywar.com, Jun. 4, 2005 http://web.archive.org/web/20050604005252/http://puppywar.com/.

Kittenwar.com, "Kitten War! May the Cutest Kitten Win!" http://kittenwar.com, retrieved Feb. 1, 2006, 8 pgs.

http://web.archive.org/web/20050930200754/www.fanball.com/commissioner/index.cfm, fanball.com, Sep. 24, 2005.

http://web.archive.org/web/20051026110900/www.myfantasyleague.com/whatsnew2005.htm, What's New, Oct. 25, 2005.

http://web.archive.org/web/20051105005315/football.myfantasyleague.com/2003/home/30078, MyFantasyLeague.com Demo, Oct. 25, 2005.

http://web.archive.org/web/20060309062600/football.myfantasyleague.com/2003/player?L=30078&P=3207, Search for All News Articles on Holmes, Priest KCC RB Now!, Oct. 25, 2005.

http://web.archive.org/web/20100703021333/http://footb...9.myfantasyleague.com/2003/options?L=30078&0=07&F=0007, MyFantasyLeague.com Demo Rosters, Oct. 25, 2005.

http://web.archive.org/web/20100703021333/http://footba1199.myfantasyleague.com/2003/player?L=30078&P=3865, MyFantasyLeague.com Demo Couch, Tim CLC QB, Oct. 25, 2005.

http://www.archive.org/web/20051202110508/football.myfantasyleague.com/2003/injury?L=30078, MyFantasyLeague.com Demo Injury Report, Oct. 25, 2005.

Official Action issued in connection with U.S. Appl. No. 11/644,170 mailed Mar. 2, 2011.

Official Action issued in connection with U.S. Appl. No. 11/495,087 mailed Mar. 10, 2011.

Official Action issued in connection with U.S. Appl. No. 11/495,087 mailed Mar. 2, 2009.

Official Action issued in connection with U.S. Appl. No. 11/347,517 mailed Jan. 21, 2011.

Official Action issued in connection with U.S. Appl. No. 11/347,517 mailed Dec. 18, 2009.

Official Action issued in connection with U.S. Appl. No. 11/347,517 mailed Aug. 6, 2009.

(56) References Cited

OTHER PUBLICATIONS

Official Action issued in connection with U.S. Appl. No. 11/589,005 mailed May 12, 2011.
Official Action issued in connection with U.S. Appl. No. 11/589,005 mailed Jan. 20, 2011.
Official Action issued in connection with U.S. Appl. No. 11/589,005 mailed Jul. 12, 2010.
Official Action issued in connection with U.S. Appl. No. 11/644,670 mailed May 11, 2011.
Official Action issued in connection with U.S. Appl. No. 11/644,670 mailed Aug. 3, 2010.

* cited by examiner

Figure 4
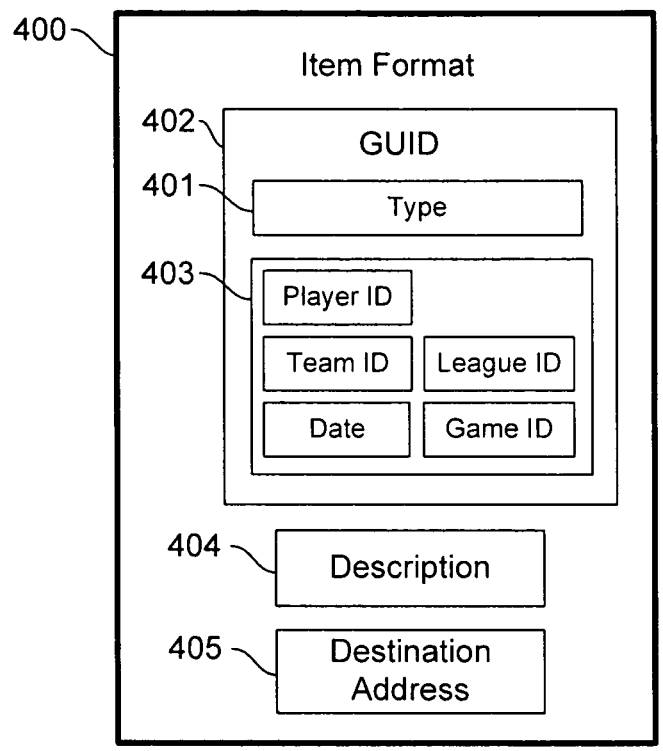
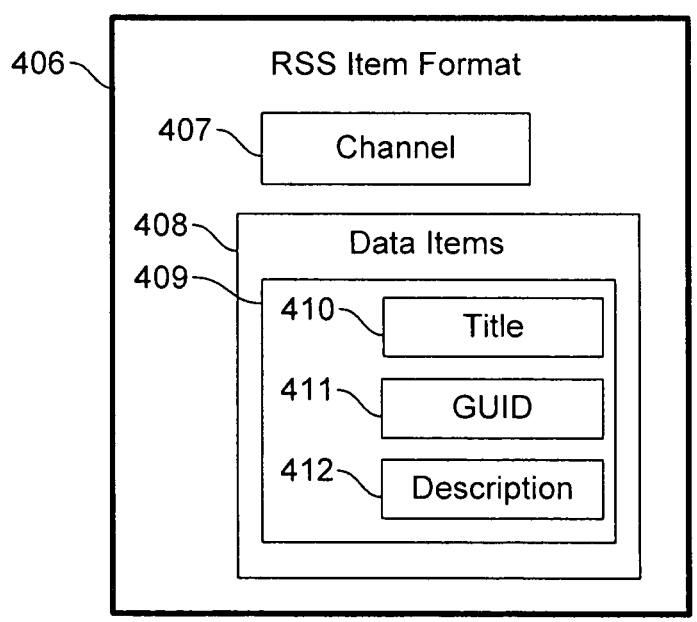

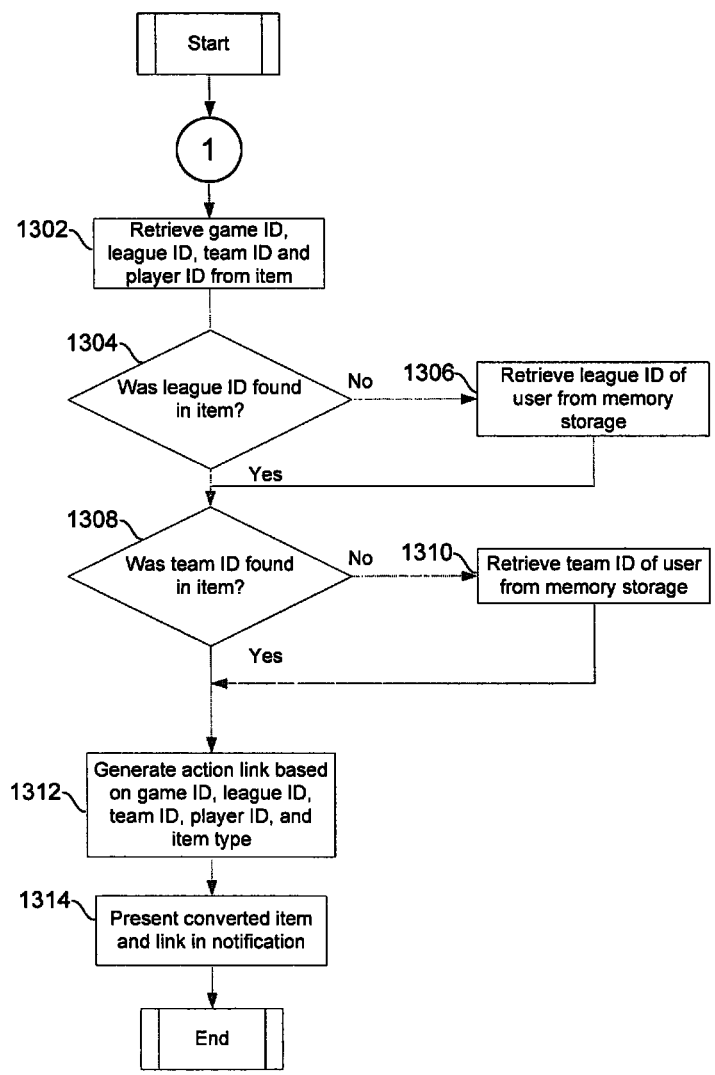

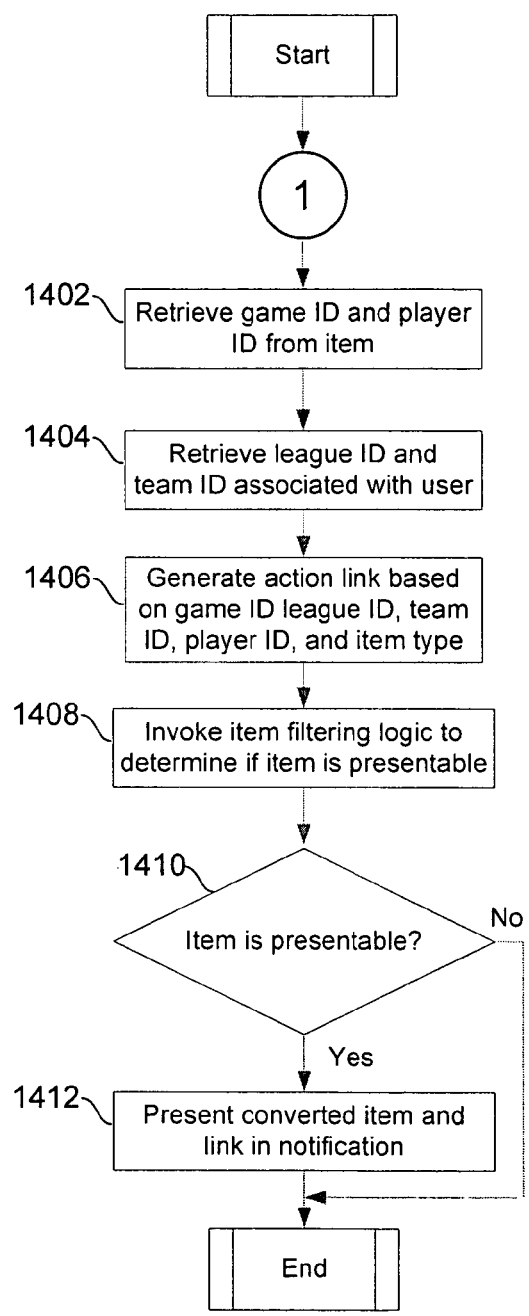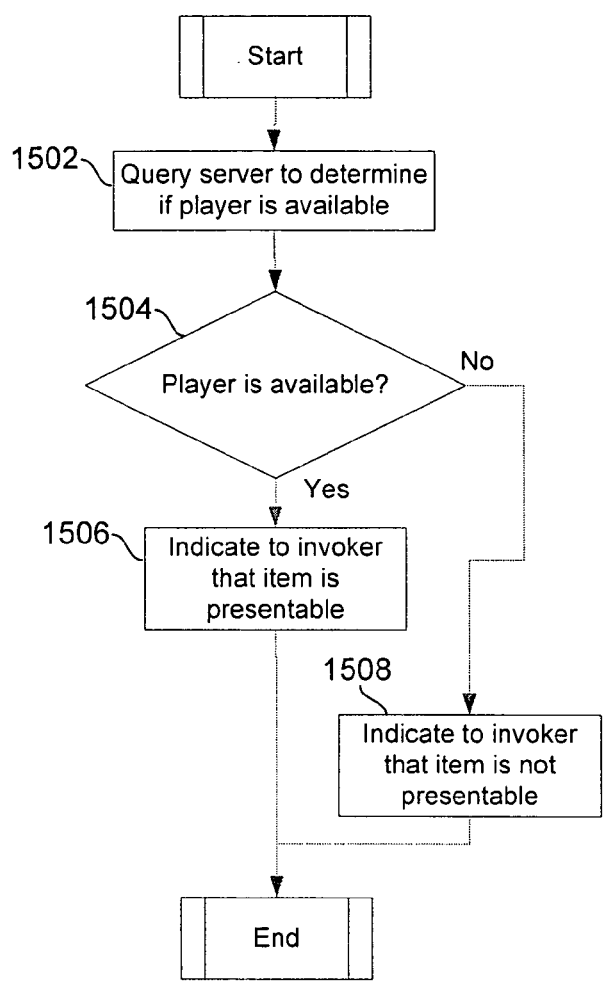

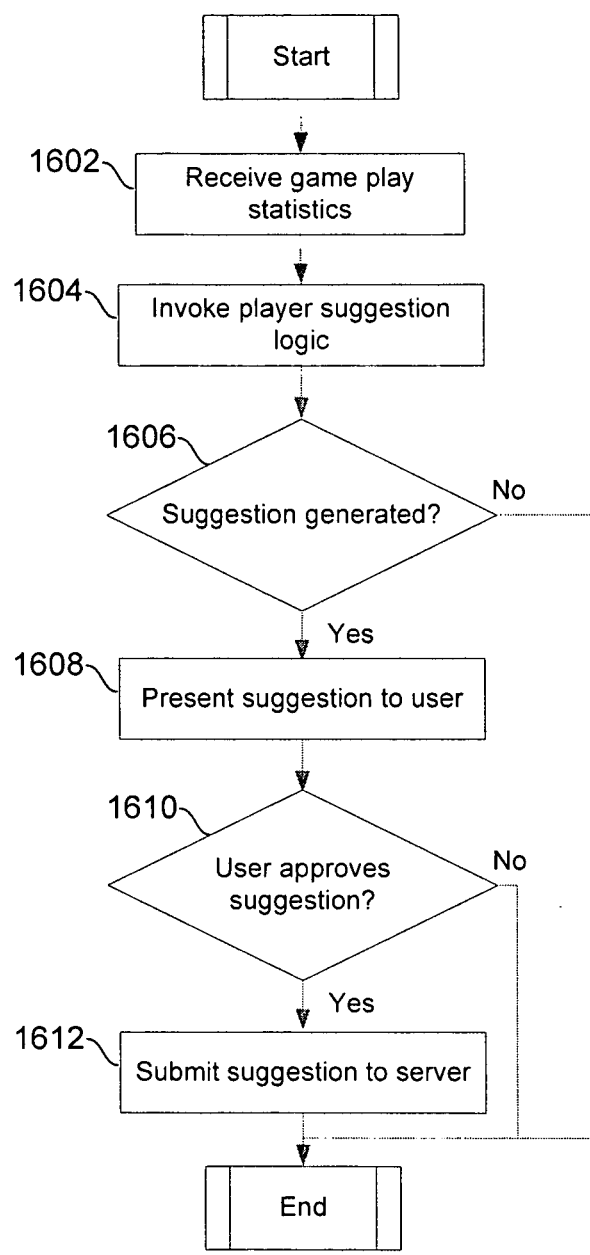

FANTASY SPORTS AGENT

CROSS-REFERENCE TO RELATED APPLICATIONS

This application is related to co-filed and co-assigned U.S. patent application titled "Fantasy Sports Alert Generator", Ser. No. 11/495,087, the contents of which are incorporated herein by reference in their entirety. This application is also related to co-assigned U.S. patent application titled "Sports Player Ranker", Ser. No. 11/347,517, the contents of which are incorporated herein by reference in their entirety.

APPENDIX

The specification includes Appendix A, which forms part of the disclosure. Appendix A includes an example fantasy sports item in RSS format.

BACKGROUND OF THE INVENTION

1. Field of the Invention

The present invention relates generally to presentation of information, and more specifically to presentation of information related to a fantasy sports game.

2. Description of the Related Art

In online fantasy sports games, such as fantasy football, baseball, hockey, golf, and automobile racing, a user can create a fantasy team. The fantasy team includes fantasy players that are based upon real-life players. The user's fantasy team may compete against fantasy teams of other users. An online fantasy sports game typically includes a player selection phase followed by a game play phase. Ordinarily, the player selection phase occurs between real-life games, and the game play phase occurs during real-life games. The game play phase typically occurs on game days, which are days on which real-life sports games are played. Statistics of players in the real-life games, such as points scored by each of the players, are used to determine the winners of the online fantasy games. The users of online fantasy sports games are typically users of an online service.

The users may access the fantasy sports games via a computer-based interface, such as a Web site. In the games, each fantasy player typically corresponds to a real-life sports player, and the fantasy player may have the same name and statistics as a real-life sports player. The statistics may include an average number of points scored per game and other measures of performance. A user chooses a limited number of players for a team with the goal of creating a team that will score the most points. The points scored by a team are ordinarily calculated as the sum of the points scored in a real-life game by the real-life players corresponding to the active fantasy players on the team. Therefore each fantasy game takes place on the same day as a corresponding real-life game. A number of rules restrict the eligibility of players to play on a particular team on a particular day. For example, a player who is injured in real-life on the day of a game is not eligible to play in the game, and a player may not be permitted to play in more than ten games for the same team.

To make good decisions about which players to add to their teams, users should locate and read relevant information from multiple information sources. In particular, users should read the statistical information associated with real-world players, real-life news articles about real-life players, news about which players are being chosen for other fantasy teams, news about players being offered for trade by other fantasy teams, and status about users' own teams, such as incomplete line-ups. However, these statistics and news items are available from different information sources and often require substantial time and effort to locate. For example, users must explicitly search for relevant news items for players of interest, and users must monitor their teams to ensure that the teams' players are eligible to play in upcoming games. Therefore, to reduce the time necessary to gather the information needed to create and manage a competitive fantasy sports team, it would be desirable to gather multiple information sources into a single source that presents the aggregated information in a timely and manner convenient manner.

SUMMARY OF THE INVENTION

In general, in a first aspect, the invention features a fantasy sports agent for notifying a user of events in online fantasy sports games. The fantasy sports agent comprises item receiving logic for receiving at least one item from a server, where the item comprises an item type and an item sports identifier, item parsing logic for retrieving the item type and the item sports identifier from the received item, and notification logic for presenting a notification to the user, where the notification is based upon the item type and the item sports identifier.

Embodiments of the invention may include one or more of the following features. The item sports identifier may comprise an item game identifier, an item league identifier, an item team identifier, an item player identifier, a content field, or a combination thereof. The fantasy sports agent may comprise a user interface widget. The item type may comprise Add Player, Drop Player, Update Starting Lineup, Update Starting Roster, Incomplete Roster, Roster Changed, Player Trade, Information Message, News Article, Player Injury Status, or a combination thereof.

The fantasy sports agent may also comprise link generation logic for generating an action link, where the action link is based upon the item sports identifier, and the action link comprises a reference to a Web page for performing an action, and the notification logic may present the action link to the user in association with the notification. The action link may comprise a Uniform Resource Locator for the Web page.

The fantasy sports agent may also comprise item filtering logic for causing the notification to be presented to the user if at least one component of the item sports identifier matches a value associated with the user, where the value is associated with the user's fantasy sports team.

The fantasy sports agent may also comprise memory logic for storing a stored sports identifier, where the stored sports identifier comprises a user league identifier, a user team identifier, and a user player identifier. The user league identifier, the user team identifier, and the user player identifier are associated with a user. The memory logic is able to provide the stored sports identifier in response to a request that specifies the user.

The notification logic may present the notification to the user if the item player identifier matches a user player identifier associated with a player on the user's team. The notification logic may present the notification to the user if the item league identifier matches the user league identifier or if the item player identifier matches the user player identifier. The notification logic may present the notification to the user if the item league identifier, the item team identifier, and the item player identifier match the user league identifier, the user team identifier, and the user player identifier, respectively.

The notification logic may present the item to the user if the item is an incomplete roster item and the item team identifier matches the user team identifier. The notification logic may present the item to the user if the item is a roster changed item and the item league identifier matches the user league identifier. The notification logic may present the item to the user if the item is a player trade item and the item league identifier matches the user league identifier.

The notification logic may present the item to the user if the item is a lineup change suggestion for adding a player and the player is available to be added to the user's team, wherein the player is identified by the item player identifier. The notification logic may present the item to the user if the item is a lineup change suggestion based on projected points and a player identified by the item player identifier is available in a league identified by the user league identifier.

The notification logic may present the item to the user if the item is a news story item that refers to a player on the user's team. The notification logic may also present the item to the user if a player identified by the item player identifier is a member of a team identified by the user team identifier. The notification logic may present the item to the user if the item is an injury status item and a player identified by the item player identifier is a member of a team identified by the user team identifier.

The fantasy sports agent may also comprise link generation logic for generating an action link, where the action link is based upon the item sports identifier and the stored sports identifier, the action link comprises a reference to a Web page for performing an action, and the notification logic is able to present the action link to the user in association with the notification. The action link may comprise a link to the Web page, where the Web page that comprises an interface for adding a player specified by the item to the user's fantasy sports team, an interface for dropping the player specified by the item from the user's fantasy sports team, an interface for changing the starting lineup of the user's fantasy sports team, an interface for sending an informational message, or a combination thereof.

In general, in a second aspect, the invention features a fantasy sports agent for providing suggestions for an online fantasy sports team. The agent comprises statistics monitoring logic for receiving game play statistics associated with at least one player, suggestion generation logic for generating a suggested action for a user if a condition is true, where the condition is based upon the statistics and the user, and notification logic for presenting a representation of the suggested action to the user.

Embodiments of the invention may include one or more of the following features. The fantasy sports agent may comprise suggestion submission logic for submitting the suggestion to a server to perform a suggested action if the user accepts the suggestion. The fantasy sports agent may comprise suggestion generation logic for identifying a first player, where the first player is available to be added to the user's team; the suggestion generation logic is able to identify a second player on the user's team, the suggestion generation logic is able to determine based upon the statistics a first weighting of the first player and a second weighting of the second player, and the suggestion generation logic is able to generate a suggestion to add the first player to the user's team if the first weighting is greater than the second weighting. The first weighting and the second weighting may be based upon player rankings generated by a fantasy sports player ranker. The first weighting and the second weighting may be based upon positions in a buzz list of the first player and second player, respectively. The first weighting and the second weighting may be based upon projected points of the players.

In general, in a third aspect, the invention features a fantasy sports agent user interface for displaying notifications of fantasy sports events in a fantasy sports game. The agent user interface comprises a notification area for displaying a visual representation of the notification, a game description area for displaying a description of the fantasy sports game, and an action area for displaying a call to action associated with an action link, where the action area is able to receive an input event directed to the action area, and where the input event is able to cause the call to action link to be opened.

Embodiments of the invention may include one or more of the following features. The notification area may comprise a text description of the notification, a graphical image based upon the notification, or a combination thereof. The game description area may comprise a game type name, a league name, a date, or a combination thereof.

In general, in a fourth aspect, the invention features a method for notifying a user of events in online fantasy sports games. The method comprises the steps of receiving an item from a server, wherein the item comprises an item type and an item sports identifier, generating an action link that refers to a Web page for performing an action, wherein the action link is based upon the item; and presenting a notification to the user if a condition is true, wherein the notification comprises the action link.

In general, in a fifth aspect, the invention features a computer program product comprising program code for notifying a user of events in online fantasy sports games. The computer program product comprises program code operable to receive an item from a server, wherein the item comprises an item type and an item sports identifier; program code operable to generate an action link that refers to a Web page for performing an action, wherein the action link is based upon the item; and program code operable to present a notification to the user if a condition is true, wherein the notification comprises the action link.

Embodiments of the invention may include one or more of the following features. The item sports identifier may comprise an item game identifier, an item league identifier, an item team identifier, an item player identifier, a content field, or a combination thereof. The condition may be considered to be true if at least one component of the item sports identifier matches a value associated with the user's fantasy sports team.

BRIEF DESCRIPTION OF THE DRAWINGS

FIG. 4 is an illustrative drawing of a general item format in accordance with some embodiments of the invention.

FIG. 13 is an illustrative flowchart of notification logic and link generation logic in accordance with some embodiments of the invention.

FIG. 14 is an illustrative flowchart of notification logic and link generation logic that performs client-side filtering in accordance with some embodiments of the invention.

FIG. 15 is an illustrative flowchart of item filtering logic for an add player link type in accordance with some embodiments of the invention.

FIG. 16 is an illustrative flowchart of suggestion generation logic in accordance with some embodiments of the invention.

DETAILED DESCRIPTION OF THE EMBODIMENTS

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Figure 1:
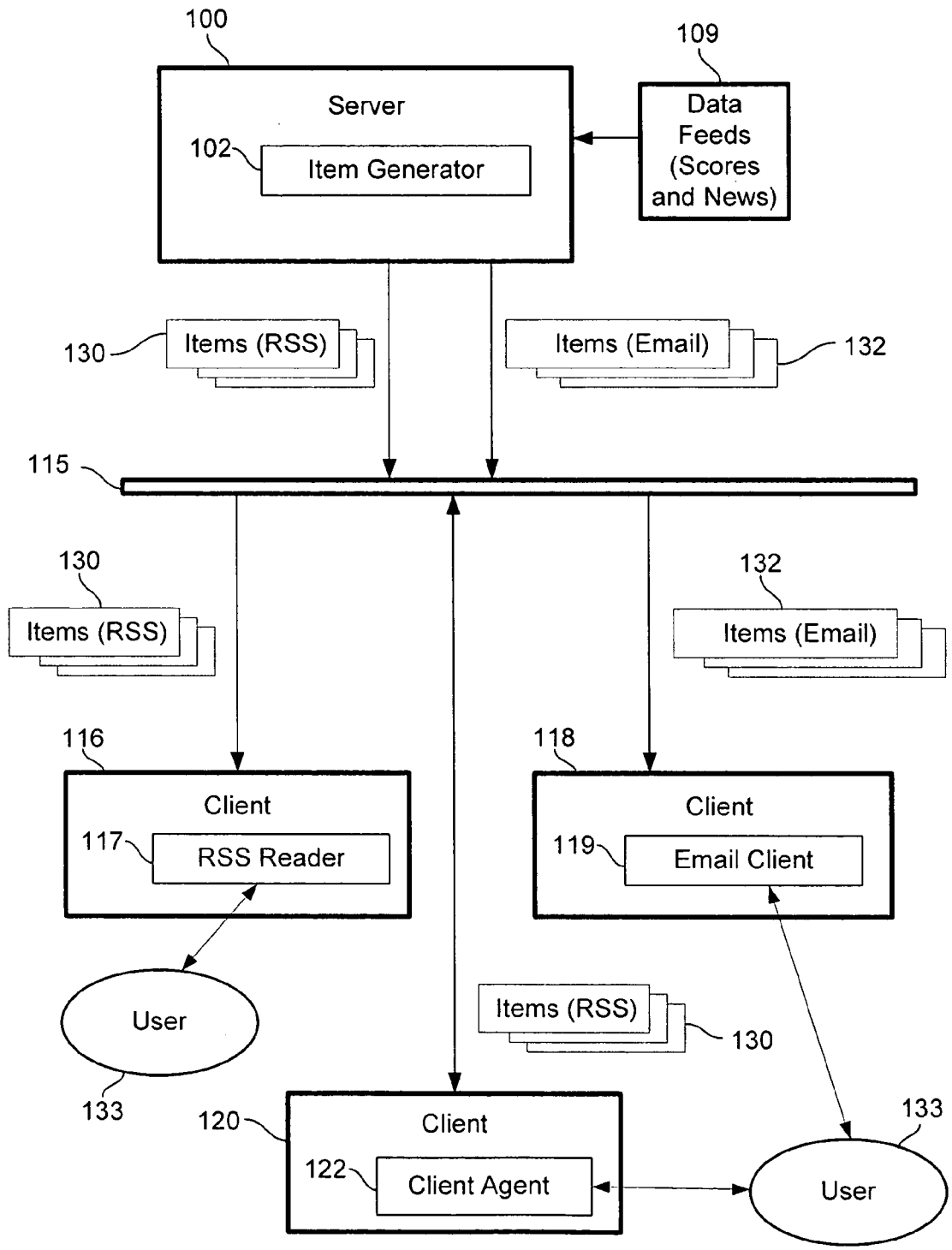
FIG. 1 is an illustrative drawing of a client/server system for notifying fantasy sports users of events in fantasy sports games in accordance with some embodiments of the invention.

FIG. 1 is an illustrative drawing of a client/server system for notifying fantasy sports users of events in fantasy sports games in accordance with some embodiments of the invention. Generally, a plurality of clients 116,118,120 may access a server 100. The server 100 and clients 116,118,120 of the present invention may include any one of various types of computer devices, having, e.g., a processing unit, a memory (including a permanent storage device), and a communication interface, as well as other conventional computer components (e.g., input device, such as a keyboard and mouse, output device, such as display). For example, the client 120 may include a desktop computer, laptop computer, mobile device such as a mobile phone, web-enabled phone, smart phone, and the like.

The clients 116,118,120 may communicate with the server 100 using suitable communication interfaces via a network 115, such as the Internet. The clients 116,118,120 and the server 100 may communicate, in part or in whole, via wireless or hardwired communications, such as Ethernet, IEEE 802.11b wireless, or the like. Additionally, communication between the clients 116,118,120 and the server 100 may include various servers such as a mail server, mobile server, and the like.

The server 100 is programmed to format data, accessed from local or remote databases or other sources of data, for presentation to users of the clients 116,118,120, for example in the formats discussed in detail below. The server 100 may utilize various Web data interface techniques such as the Common Gateway Interface (CGI) protocol and associated applications (or "scripts"), Java™ "servlets", i.e., Java™ applications running on the Web server, or the like to present information and receive input from the clients 116,118,120. The server 100 may be implemented as, for example, a computer program, and may include a web server, e.g., Apache™ or the like. The server 100, although described herein in the singular, may actually comprise plural computers, programs, devices, backends, and the like, communicating (wired or wireless) and cooperating to perform the functions described herein.

The server 100 includes an item generator 102, which comprises logic for generating fantasy sports items 130,132, such as RSS Items 130 and Email Items 132, based upon content such as real-life sports news and score data received from content data feeds 109. The fantasy sports items 130,132 are also referred to herein simply as items. Each of the items 130,132 describes a specific fantasy sports event. An event corresponds to an occurrence in the fantasy sports game, e.g., a change in a team's roster, a trade of a player between teams, or availability of a relevant news story. In one aspect, each of the items 130,132 is generated relatively soon after the corresponding fantasy sports event occurs. These different types of occurrences are all considered to be events because they all share the common property of being occurrences that are of interest to a user of the fantasy sports game. An event may be based upon a fantasy sports team, e.g., an event that describes a roster changed event, a roster incomplete event, or a player trade event for a fantasy sports team. The event may be based upon a fantasy sports player, possibly in combination with a sports team, e.g., the number different fantasy sports teams to which a player has been added, or upon a projected points value calculated for a player. The event may be based upon a news story, possibly in combination with a player or a team, e.g., upon a news story that refers to a player on a fantasy sports team that is associated with a user.

A fantasy sports item is a set of data values that represents an event related to a fantasy sports team or player in a fantasy sports game. Fantasy players represent real-life players, so items 130,132 can represent an event related to a player simply by including the player's name. For example, a Roster Changed Item represents a team roster change. A roster is a subset of players on a fantasy sports team. The players on the roster are ordinarily the players on the team who are playing in a game, or will play in an upcoming game. Each player on the roster may have an associated position, e.g., quarterback for football. A roster change when a player is added to the roster, or when a player is removed from the roster, or when the position of a player on the roster is changed. The Roster Changed item includes data values such as a team name and a player name. A fantasy sports item format, i.e., type, is a specification of the data values that are included in a fantasy sports item for a specific type of event. A Roster Changed item format, for example, would specify that a Roster Changed item includes a team name and a player name, and, optionally, that the names are of a particular data type, such as a string of characters.

The items 130,132 are typically represented as data or messages that describe the event and, optionally, provide a suggested action based upon the event. The suggested action is referred to herein as a "call to action". Each item may also include a time stamp which indicates the time at which the event occurred, and one or more addresses, which directly or indirectly identify at least one user 133 to which the item is to be delivered or displayed. The addresses may be, for example, names of teams, or names of players, or names of users 133.

The RSS Items 130 represent events in fantasy sports games using the RSS (Rich Site Summary or Really Simple Syndication) syndication format. The RSS Items 130 may be, for example, XML documents which describe fantasy sports events such as team roster changes or relevant news stories. An RSS feed provided by software executing on the server 100 provides the RSS Items 130 to the clients 116, 118, 120, which may access the RSS Items 130 via the network 115. According to the RSS protocol, the clients 116, 118, 120 may retrieve the RSS Items 130 from the server 100. Alternatively, a "push" protocol, e.g., based on TCP/IP, could be employed for sending the items, e.g., the RSS Items 130, to the clients 116, 118, 120 as the events happen, so that the clients need not poll the server for the items. The address or addresses to which the RSS Items 130 are to be delivered are represented as an RSS channel identifier, which is typically included in the RSS Items 130. Each fantasy team in each fantasy league has an associated RSS feed, which is tailored to that team and provided by, for example, an RSS feed generator running on the server 100. Each league may have different teams with different combinations of players, so the feed components that deliver player news are different for each team, so that each team does not receive information related to players not on the team. The components of an RSS feed that are based on events in a fantasy sports league would be different for each league, so that users 133 in one league do not receive information regarding events in other leagues. For example, a trade in one league would not trigger the generation of an RSS item in any other leagues. An example Add Player RSS item is shown in Appendix A.

Each user 133 is associated with a user login session (not shown), which is established between the client 120 and the server 100 when the user 133 logs into the server 100 by providing a user name and a password. The server 100 therefore maintains a user identifier that identifies the user 133. The identifier may be a number, a string value, or some other value that corresponds to the user. Note that the abbreviation "ID" is used herein as an abbreviation for "identifier". Entities such as players, leagues, teams, and users are also referred to by identifiers. For example, a league ID is a value that identifies a particular fantasy sports league. In one example, an identifier is a number that maps to a database record that contains information about the entity, such as a name, e.g., a league name or a user name. In another example, the identifier may be a string, such as the name of an entity, e.g., a user name or a team name.

The RSS Items 130 may be accessed, i.e., read, and delivered to the user 133, by an RSS Reader 117 executing on the client 116. The RSS Reader 117 displays the RSS Items 130, including a description of the event and a call to action, e.g., a web link or Uniform Resource Locator (URL). The description and the call to action are typically included in the RSS Items 130. The RSS Items 130 may also be acccessed and delivered to a user 133 by a client agent 122 executing on the clients 120. The call to action may include the identities of the league, team, and player involved in the event, and may be information for constructing a web link, instead of an actual web link, in which case the client agent 122 may construct the web link based on the information in the call to action. The client agent 122 and the call to action are described in more detail below.

Fantasy sports events may also be represented as electronic mail (email) messages. Email Items 132 may be sent by the item generator 102 via the network 115 to an email client 119 executing on the client 118, and to any other email clients capable of accessing the network 115. In the Email Items 132, the fantasy sports event may be represented as text in a defined format, e.g., name-value pairs with well-known names, or translated into natural language phrases, or as an XML document similar to that used in the RSS Items 130. The address or addresses to which the Email Items 132 are to be delivered are represented as email addresses, which are typically included in the Email Items 130.

Figure 2:
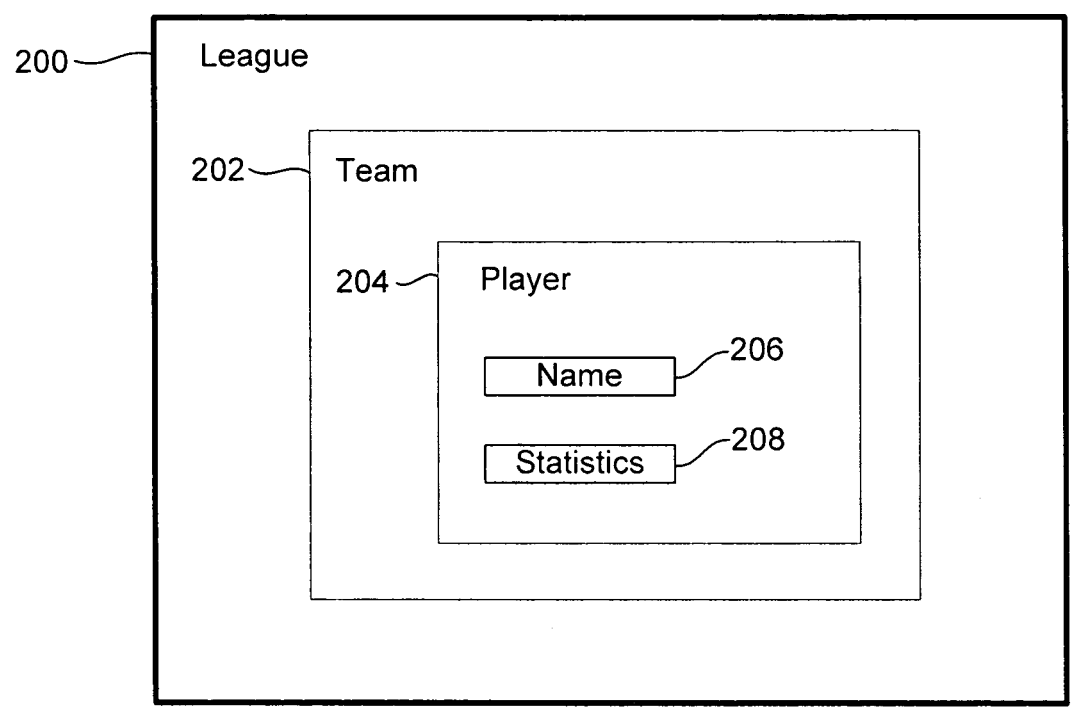
FIG. 2 is an illustrative drawing of a hierarchical relationship between leagues, teams, and players in accordance with some embodiments of the invention.

FIG. 2 is an illustrative drawing of a hierarchical relationship between leagues, teams, and players in accordance with some embodiments of the invention. Fantasy sports games are conducted at least partially online, e.g., on a web site, using statistics of real-life players from real-life games. The fantasy sports game may be, for example, fantasy baseball, which is based on the rules of baseball, fantasy football, which is based on the rules of football, or fantasy golf, which is based on the rules of golf. The fantasy sports game may include one or more fantasy leagues 200, which represent sports leagues, but typically do not correspond directly to real-life leagues. Furthermore, the teams 202 represent fantasy sports teams but typically do not correspond directly to real-life teams. However, the players 204 typically are based upon real-life players. In one example, a fantasy sports league 200 includes at least one fantasy sports team 202, and each team 202 includes at least one fantasy sports player 204 and is typically associated with a user 133 of FIG. 1, who manages the team via a user interface provided by clients 116,118,120. Each player 204 includes a name 206, e.g., Reggie Jackson, and statistics 208, which describe the performance of the player 204 in previous games. In one example, the statistics 208 describe the performance of the player 204 in real-life games, and are typically cumulative over all games in which the player 204 has played since the start of a fantasy sports season. The statistics 208 may be based upon the real-life statistics of the real-life player that corresponds to the player 204. The statistics 208 may also describe the performance of the player 204 in a game currently in progress. The particular components included in the statistics 208 are based upon the statistics commonly used to evaluate players in the corresponding real-life game. For example, in fantasy baseball, for players who are batters, the statistics may include number of home runs, number of hits, and batting averages. For players who are pitchers, the statistics may include an Earned Run Average (ERA), number of wins (W), and number of losses (L).

The league 200, team 202, and fantasy player 204 may be, for example, data structures or objects in a computer memory, and may be implemented in a computer programming language such as Java™, JavaScript™, or the like. The term "includes" as used with respect to these entities may refer to inclusion of one entity (e.g., the fantasy player 104) by value, i.e., within the memory region of the including entity (e.g., the team 202), or may refer to association by reference from an including entity (e.g., the team 202) to an included entity (e.g., the fantasy player 204).

Figure 3:
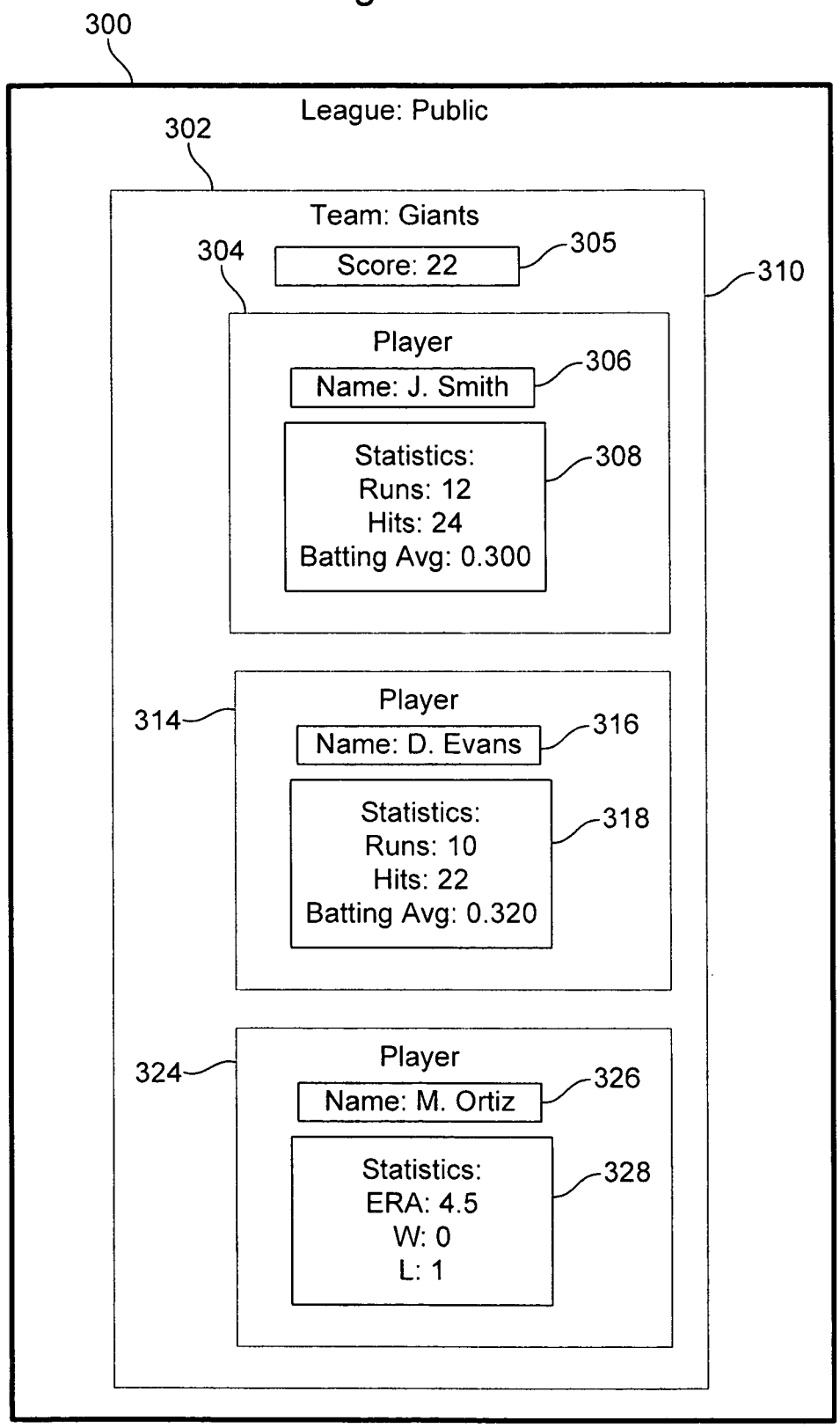
FIG. 3 is an illustrative drawing of an example fantasy sports league data model in accordance with some embodiments of the invention.

FIG. 3 is an illustrative drawing of an example fantasy sports league data model in accordance with some embodiments of the invention. A league 300 named Public includes a team 302 named Giants. The Giants team 302 has an associated fantasy score 305, which is calculated based upon the statistics of the players on the team 302, e.g., as the sum of the scores of the players on the team 302. The players on the team 302 include a first player 304 named J. Smith with associated performance statistics 308. The statistics 308 include a number of runs scored, a number of base hits, and a batting average. A second player 314 on the team 302 is named D. Evans and has associated performance statistics 318. The statistics 318 include a number of runs scored, a number of base hits, and a batting average. A third player 324 on the team 302 is named M. Ortiz and has associated performance statistics 328. The statistics 320 include an Earned Run Average (ERA), a number of Wins (W), and a number of Losses (L). The players 304, 314, 324 include names 306, 316, 326, respectively, which are the names of the respective players.

The first player 304, J. Smith, is a batter and therefore has batter statistics 308, which include number of runs, number of hits, and batting average. The second player 314, D. Evans, is also a batter and has batter statistics 318. The third player 324, M. Ortiz, is a pitcher and has pitcher statistics 328.

FIG. 4 is an illustrative drawing of a general fantasy sports item type format 400 in accordance with some embodiments of the invention. This item type format 400 illustrates the information to be delivered from the server 100 of FIG. 1 to the clients 116, 118, 120 of FIG. 3 in the form of the items 130, 132 to inform users 133 of the clients of events related to the fantasy sports game. The items 130, 132 ordinarily conform to the general item format 400. Each item 130, 132 includes sufficient information to describe the event to the client 116, 118, 120, and therefore allow the client to inform the user 133 of the event.

The item format 400 includes a Globally Unique Identifier (GUID) 402. The GUID 402 represents an action that can be performed by a user in response to an event in a fantasy sports game. The GUID 402 includes a type identifier 401, which identifies the type of the item, e.g., a roster changed item, a player trade item, and so on. The type 401 is based upon the type of event that triggered the item. The type 401 may be a numeric value which is unique for each type of item, e.g., 2 for a roster changed item, 3 for a player trade item, and so on. In one aspect, the league, team, and player, and other information, are combined to form the GUID 402 which clients may use to create URL's (i.e., web links) that can perform an action in response to the item. The action may be, for example, adding a player to the user's team. The server 100 provides server-side action logic that performs these actions in response to a request for a Web page or Web service associated with the action logic. The Web page or Web service is accessible at a URL that the server constructs from the information in the GUID 402. The client constructs the URL from the GUID as well, using the same format as the server, so that the client can present the URL to the user in a client-side user interface. When the user selects the link, the client will request the Web page or Web service from the server, which will cause the action defined by the GUID 402, such as adding a player to the user's team, to be performed.

The GUID 402 may include a game ID, which identifies the type of fantasy sports game, e.g., "Fantasy Baseball", a league ID, which identifies a league associated with the action, a player ID which identifies a player associated with the action, a date which identifies the date and time at which the action occurred, and a type, which describes the type of action, e.g., Add Player or Drop Player from the user's team. In one aspect, the GUID 402 may be of the format GUID=<game> <league_id> <player_id> <date> <type>. The GUID 402 may be represented as, for example, a web link or information for creating a web link, such as a server page name and names of a league, team, and player associated with the item A user's team is a team associated with a user. Typically, one team in a particular league is associated with a user. A player is said to be "on a user's team" to indicate that the player is a member of the user's team, i.e., the player is on the team's roster.

The GUID 402 is, in one aspect, a value that identifies the action. The GUID 402 also provides information for displaying a Call to Action, e.g., a web link, for performing the action. The server 100 provides a network-accessible web page or service that the user can load or invoke to performing an action associated with the GUID 402. The web page is ordinarily accessible via a URL that is based upon the GUID 402. The client agent 122 is able to determine the URL from the GUID. The client agent 122 can then present the user with the web link, and the user can perform the action by following the web link or invoking the web service.

The term "sports identifier" is used herein to refer to an identifier that includes one or more of the components of the GUID. For example, a sports identifier may be a game ID and a league ID, or a game ID, a league ID, and a player ID. A client may use the type 401 of the event represented by the GUID to decide whether or not to show a notification, or to show a reminder notification. A client may allow users to configure which notification types are to be generated, e.g., by providing a list of notification types with associated check boxes that the user can check or uncheck to enable or disable, respectively, notifications of the corresponding type.

The GUID described above is for a specific league, and the server 100 of FIG. 1 will send the items 130, 132 to each client agent 122 for which the user 133 of the agent 122 is associated with the league and team contained in the GUID 402. In that configuration, which is referred to as a "smart server" configuration, the client agent 122 can simply display a notification for every item the client agent 122 receives.

In a second configuration, referred to as a "smart client" configuration, the server may omit the league ID from the GUID 402 on the items sent to the client, in which case the client determines the league ID based upon the current user. In this "smart client" case, the GUID includes the game ID, player ID, date, and notification type. In one aspect, the GUID 402 for the smart client configuration may be of the format GUID=<game> <player_id> <date> <type>.

Furthermore, in the smart client case, the server need not be a smart server; instead, the server may address the items 130,132 to all clients without regard for the relevance of the items to the user 133 of each client 122.

In the smart server configuration, the server performs more computation, and more information is sent over the network 115 in the items 130,132 than in the smart client configuration. In the smart client configuration, some computation is performed by the client 120 instead of the server 100, and less information is sent over the network 115 in the items 130,132, which may lead to less computational load on the server 100 and the network 115 than in the smart server configuration, since a portion of the computational load is distributed to the clients. The smart server and the smart client configurations can both provide the same information to the user 133, but with different performance characteristics. Both the smart server and smart client configurations can be in use at the same time, with some items using the smart server configuration and some items using the smart client configuration, and the client agent 122 performing the appropriate processing based upon the presence or absence of the league ID and similar information in the items 130,132.

For example, in the smart server configuration, the GUID for a "buzz list add" action, which indicates that a player has been added to a buzz list, would include a game identifier, a league identifier, a player identifier, a date, and a type, where the type is "buzz_add". Therefore, in the smart server configuration, the server would generate the GUID in the format GUID=<game> <league_id> <player_id> <date> "buzz_add".

For the smart client configuration, the client will look up the league identifier, e.g., in the client's memory, so the server need not send the league identifier to the client. Therefore, in the smart client configuration, the server would generate the GUID in the format GUID=<game> <player_id> <date> "buzz_add".

In one aspect, each buzz add action may be uniquely identified by its player identifier, because there is one global set of buzz add actions per day, and for any given day, the users have added a specific set of players. Buzz add actions are generated for the most popular players for that day, e.g., the players added the greatest number of times that day. In one aspect, a suggestion for adding a player to a user's team is generated if a player is at the top of the buzz list, i.e., in one of the highest positions in the buzz list, meaning that the player has been added to more teams than most other players, and the player has been added to more than a predetermined number of teams. Furthermore, minimum criteria may be associated with the buzz list, and as players meet those criteria, some players may surpass others on the buzz list, resulting in buzz add actions.

The item format 400 also includes optional attributes 403 which may include, for example, a name or identifier of a player, team, league, or game involved in the event, and the date and time at which the event occurred. The item format 400 may also include a description 404 of the event, which may be, for example, human-readable text describing the event, and an address 405, which identifies intended recipients of an item. In one aspect, items are delivered from the server 100 to clients such as the client 120 via the network 115. The intended recipient, i.e., consumer, of an item is typically a user 133. The address may be, for example, the names of one or more teams to which the item is related, in which case the item may be delivered to users of those teams. As another example, the address may be the names of users, in which case the item may be delivered to those users.

Other item formats are possible. For example, one or more of the elements of the item format 400, such as the GUID 402 or the description 404, could be omitted, or additional data fields could be included in the item format 400, such as a time stamp indicating the time at which the item was generated.

An RSS Item 406 is a variant of the item format 400 for use with the RSS protocol. The RSS Item 406 includes a channel identifier 407, and a list 408 of at least one data item 409. Each data item 409 includes a title 410, a GUID 411, and a description 412. In one aspect, the channel 407 is based upon the item type 401, the title 410 is based upon the description 404, the GUID 411 is based upon the GUID 402, and the description 412 is based upon the description 404. The protocol-independent item format 400 can be converted to the RSS Item format 406 as described below.

Figure 5A:
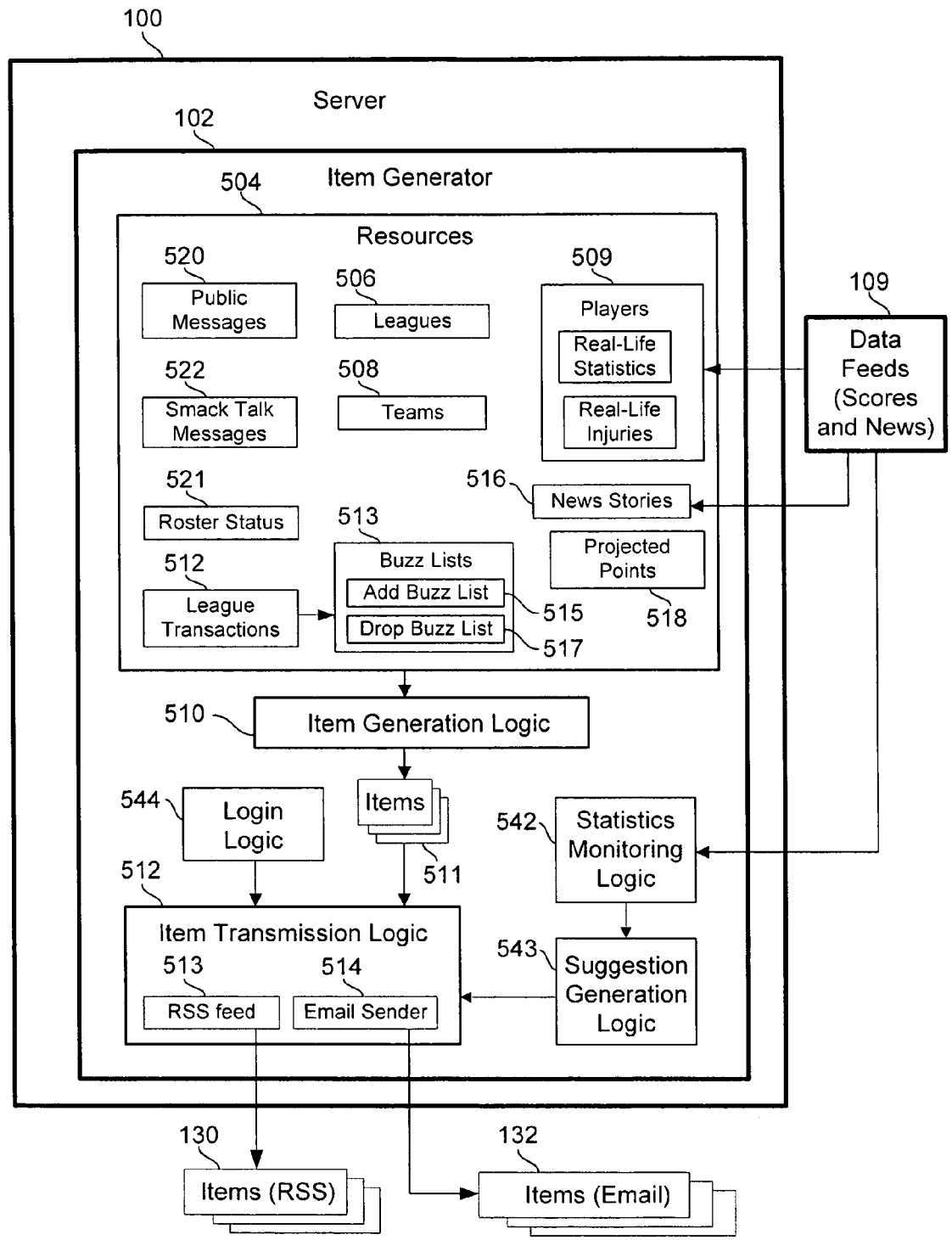
FIG. 5A is an illustrative drawing of an item generator in accordance with some embodiments of the invention.

FIG. 5A is an illustrative drawing of an item generator 102 in accordance with some embodiments of the invention. In one aspect, the item generator 102 provides notification of fantasy sports events to clients via the network 115 of FIG. 1. The item generator 102 may operate in conjunction with a server program, e.g., the Apache web server, and may be implemented by computer program code in a programming language such as Java™ or JavaScript™. The item generator 102 may be included in a single server process, or may be divided among multiple server processes. For example, leagues 506 and teams 508 may be in a first server process, and players 509 may be in a second server process, where the first and second server processes communicate via an inter-process communication mechanism such as shared memory or message passing. The item generator 102 may also be distributed across multiple servers 100. For example, the leagues 506 may be in a first server process 102 executing on a first server 100, and the item generation logic 510 may be in a second server process executing on a second server.

The item generator 102 includes resources 504, which represent entities and information in a fantasy sports game. The resources 504 may be, for example, data structures or objects stored in a computer memory, with associated computer program code for accessing and processing the data structures or objects. The resources 504 include leagues 506, teams 508, and players 509. Ordinarily the leagues 506 include at least one league, the teams 508 include at least one team, and the players 509 include at least one player. Each of the leagues 506 is typically associated with at least one team, and each team is associated with at least one player, as described above with reference to the league 200 of FIG. 2. Each player is associated with real-life statistics such as a batting average, and any other relevant real-life information, such as an injury status that indicates whether the player is unable to play because of an injury. In other examples, the leagues 506 may include the teams 508, but the teams 508 need not include players.

The resources 504 also include real-life sports news stories 516, which are received from the content data feeds 109. The news stories 516 are articles or summaries of articles related to real-life sports players, teams, or leagues. Logic such as the item generation logic 510 searches the text of the news stories 516 for text, e.g., character strings, relevant to fantasy sports players. For example, the item generation logic 510 may search the news stories 516 for names of players in a particular league or on a particular team. For each article that contains the name of a player, the item generation logic 510 may generate a news story item, which will be delivered to users who wish to receive news stories about that player.

The resources 504 also include public messages 520, which are human-readable messages that are sent to users by the item generation logic 510 or by other users to convey information. The resources 504 also include smack talk messages 522, which include a human-readable smack talk message for each user. A smack talk message is a public message made available by a user to be read by other users, e.g., to taunt other users. Users may change their smack talk messages. If a smack talk message is changed, the new message is made available to other users.

The resources 504 also include a list of league transactions 512, which may be, for example, adds, drops, or trades of players to and from teams in each of the leagues 506. Each transaction listed in the league transactions 512 includes an element that identifies the league in which the transaction occurred. Entries may be made in the league transactions 512 as the transactions occur, so that users can be informed of transactions relatively soon after the transactions occur. Note that the representation of the resources 504 shown in FIG. 5A is one example, and other arrangements are possible. For example, the league transactions could be included in the leagues 506, with the transactions for a league stored in a data structure or table associated with or referenced by the data structure or table that represents that league.

The resources also include a roster status 521. The roster status 521 indicates whether the lineup of each of the teams 508 is incomplete or has changed. These status values may be, for example, true or false. The roster status 521 is updated by game logic (not shown) whenever a change is made to a team's roster.

The resources 504 also include buzz lists 513, which are ordered lists of a subset of the players 509 sorted in descending order by criteria such as the number of times each player has recently been added to a team or dropped from a team. In particular, the buzz lists 514 include an add buzz list and a drop buzz list. The add buzz list is sorted in descending order by the number of times each player has been added to a team, and the drop buzz list is sorted in descending order by the number of times each player has been dropped from a team.

The resources 504 also include projected points 518, which are pre-game estimates of the points that particular players or teams will score in a current or future game. The projected points 518 may be calculated based upon, for example, the player's past performance, such as the points scored by that player in previous games, or in a subset of previous games that are similar to the current or next game. The projected points 518 are calculated by, for example, computer program code which may be included in the projected points resource 518.

The item generator 102 also includes item generation logic 510, which generates items 511 that describe fantasy sports events, and item transmission logic 512, which sends representations of the items 511 to clients via network protocols such as RSS and Email. The items 511 are generated in response to the occurrence of fantasy sports events. Fantasy sports events may include events in the real world of sports, such as news items or player statistics. Descriptions of such real-world events are ordinarily received by the item generator 102 from data feeds 109, and the item generator 102 uses those descriptions to generate the items 511. Fantasy sports events may also include events in the fantasy sports game, such as trades of players among fantasy sports teams, roster status of fantasy sports teams, and the like, in which case the item generator 102 uses the resources 504 to generate the items 511.

Each of the items 511 may be described by the item format 400 of FIG. 4. The item generation logic 510 generates values for the field values of the item format 400. In particular, the item generation logic 510 may generate the GUID 402 by, for example, concatenating the game identifier, league identifier, player identifier, date, and type of the event represented by the item as described above with reference to FIG. 4. In another example, referred to herein as a smart client configuration, in which the client determines the league identifier, the item generation logic 510 may omit the league identifier from the GUID 502, in which case the client will determine the league identifier.

Furthermore, the item generation logic 510 may set the description 404 of the item format 400 to a description of the event represented by the item. The item transmission logic 512 may set the destination address 405 of the item to the network address or name of a particular client or user to whom the item is to be sent. The RSS feed 513 and Email Sender 514 may similarly generate RSS items 130 and Email items 132, respectively, and set the fields of the generated items. The RSS items 130 may be described by the RSS item format 406 of FIG. 4. The RSS feed 513 may set the channel 407 of each of the RSS items 130 to a channel identifier that corresponds to the particular client or user to whom the item is to be sent. The RSS feed 513 may set the title 410 and the description 412 to describe the event represented by the RSS item, and may set the GUID 411 in the same way that the protocol-independent GUID 402 is set, as described above.

The fantasy sports items 511 may be a set of or a stream of fantasy sports items, in which each fantasy sports item represents an event related to a fantasy sports game. In one aspect, each of the fantasy sports items 511 corresponds to an event, and includes data elements or attributes which describe the event. The fantasy sports items 511 are protocol-independent and conform to the general Item format 400, while the RSS Items 130 conform to the RSS Item format 406. The items 511 can be mapped to other protocols in addition to RSS, such as Email or HTTP. In particular, the address 405 can be converted to the RSS channel identifier 407, the description 404 and condition 401 can be converted to the RSS title 410 and description 412, and the GUID 402 can be converted to the RSS GUID 411. The conversion may involve a simple assignment of values, or may include conversion of values from one format, such as plain text, to another format, such as XML-format text data.

The fantasy sports items 511 may be delivered directly to clients without being transformed to a different format such as the RSS Item format 406, or the fantasy sports items 511 could be generated directly in the format desired by the client. That is, the items 511 may conform to the RSS Item format 406, and the items 511 may be the same as the RSS Items 130. The items 511 and RSS Items 130 are shown as separate entities to illustrate that the items 511 can be distributed to different types of clients via different types of protocols, e.g., Email and RSS. If only one type of client or protocol is to be used, then only a single item format may be necessary, in which case there would be no need to convert between the items 511 and the RSS Items 130.

The item generator 102 also includes login logic 544 for verifying the identity of users (not shown) of the fantasy sports game. Since the items 511 may describe events related to a league, team, or player associated with a specific user or users, the item generator 102 may maintain information about the identifies of users, e.g., user names, and the association of those users with particular leagues 506, teams 508, and players 509. The login logic 544 provides for verification of the identity of those users by receiving user identification and authentication information, such as a user name and a password, from the client agent 122 of FIG. 1 when users access the fantasy sports game. The login logic 544 may maintain a session identifier for each user, and include the session identifier of a user in items 511 generated for that user.

The item transmission logic 512 sends the items 511 to clients via a network 115. The item transmission logic 512 may transmit, i.e., send, each of the items 511 to selected clients to which the item is relevant to reduce network utilization and improve performance, in which case the item transmission logic 512 is said to be in a "smart server" configuration. Alternatively, the item transmission logic 512 may transmit each of the items 511 to clients in a broadcast-like fashion, without explicitly identifying the clients.

The item transmission logic 512 causes the fantasy sports items 511 to be made available to clients such as the client 120 of FIG. 1 via the network 115 by passing the items 511 to an RSS feed 513, an Email Sender 514, or a sender for some other network protocol. The RSS Feed 513 converts the items 511 into RSS Items 130, which are essentially XML-format representations of the items 511 in the well-known RSS format, as known to those skilled in the art. Each of the RSS Items 130 includes the information shown in the RSS Item Format 406 of FIG. 4. The RSS Feed 513 essentially translates the items 511 into the RSS Items 130 and makes the RSS Items 130 available using the well-known RSS protocol. The contents of the RSS Items 130 are described in more detail below.

The Email Sender 514 converts the fantasy sports items 511 into Email Items 132, which may be, for example, human-readable representations of the items 511, e.g., electronic mail messages which describe the items. The email sender 514 may send the Email Items 132 via the network 115 to email clients, e.g., to specific email addresses, which represent users, or to email distribution list addresses which represent groups of email addresses. The Email Sender 514 would typically have a list of email addresses which correspond to teams, or a list of user email addresses, and a table for converting team names to email addresses. When converting a fantasy sports item 400 to an email message, the Email Sender 514 would set the "To" address of the email message based upon the address 405 of the item 400. For example, if the address 405 is the name of a team, the Email Sender 514 would set the "To" address of the email message to the email address of the user associated with that team, or to a distribution list associated with that team. In one example, the Email Sender 514 is used with the smart server to allow usage with typical email clients.

The contents of the fantasy sports item 400 could be converted to an email message body by, for example, converting the item type 401 of FIG. 4 to a text description, e.g., type 2, which indicates a Roster Changed Item, would be converted to the text "Roster Changed Item", which would be included in the subject or body of the email message. Similarly, the attributes 403 in the item, e.g., the team name, as well as the description 404, would be converted to text and included in the subject or body of the email message. The GUID 402 would also be included in the email message, and would be displayable as a web link by email clients that support web links in email messages.

The item generator 102 may be configured to generate suggestions, i.e., suggested actions, to be sent to users. In one aspect, the suggested actions are sent to clients associated with users for which the suggestions are generated. Suggestions are generated when corresponding conditions are satisfied, such as when a highly-rated player becomes available for a trade. A suggestion would then be generated, for example, to suggest to the user that the highly-rated player should be added to the user's team. Suggestions may be generated by the server or the client, depending on whether a system administrator prefers to devote server computational resources or client computational resources, respectively, to the task of generating the suggestions. When configured to generate suggestions, the item generator 102 includes statistics monitoring logic 542 and suggestion generation logic 543. The statistics monitoring logic 542 receives statistics, i.e., information about teams and players, including data about the performance of players, from the data feeds 109 and maintains, e.g., calculates and stores, the statistics. The particular statistics that are maintained are typically those that are used by the suggestion generation logic 543, and may include, for example, batting averages and earned run averages of players in baseball games, average points scored of players, rushing or passing yards of players in football games, projected points for each player (which may be provided by the projected points resource 518), buzz list rankings for each player (which may be provided by the buzz list resources 513), and the like. The suggestion generation logic 543 generates the suggestions based on the statistics. In one aspect, the suggestions are represented as items 511 which are generated by the suggestion generation logic 543 and sent by the item transmission logic 512 to the client for presentation to the users for whom the suggestions are generated, in the same way that items 511 generated by the item generation logic 510 are sent.

As an example, the suggestion generation logic 543 may suggest alternative lineups that are likely to improve the performance of a user's fantasy sports team. In this example, for leagues that may alter lineups every day, the suggestion generation logic 543 could ensure that the desired number of eligible players are playing on the user's team each day. The suggestion generation logic 543 could also submit the alternative lineups on behalf of the user, once the user has accepted the alternative lineups, to make the suggested lineup change. The suggestion generation logic 543 may perform other types of analysis as well, including searching the available players for players that would likely benefit the user's team, as predicted by, for example, the players' rankings, statistics, or popularity. Players that would likely benefit the user's team may be players that have higher, i.e., greater or better, rankings than player's on the user's team, or players whos rankings have recently changed substantially. Players that are moving on the buzz add list, but are below the threshold of the buzz add process which generates add suggestions for players at the top of the buzz list, are also likely to benefit the user's team.

The suggestion generation logic 543 may include a persistent nag feature which displays or presents important or time-sensitive items to the user, such as alerts, buzz list changes, injuries, and optimal lineups. The persistent nag feature repeatedly notifies the user of a situation, such as injury of a player, even if the user dismisses the notification. The notification could be, for example, a daily or twice daily reminder that the injured player is in the user's team lineup. The persistent nag feature can be toggled on or off by the user.

Figure 5B:
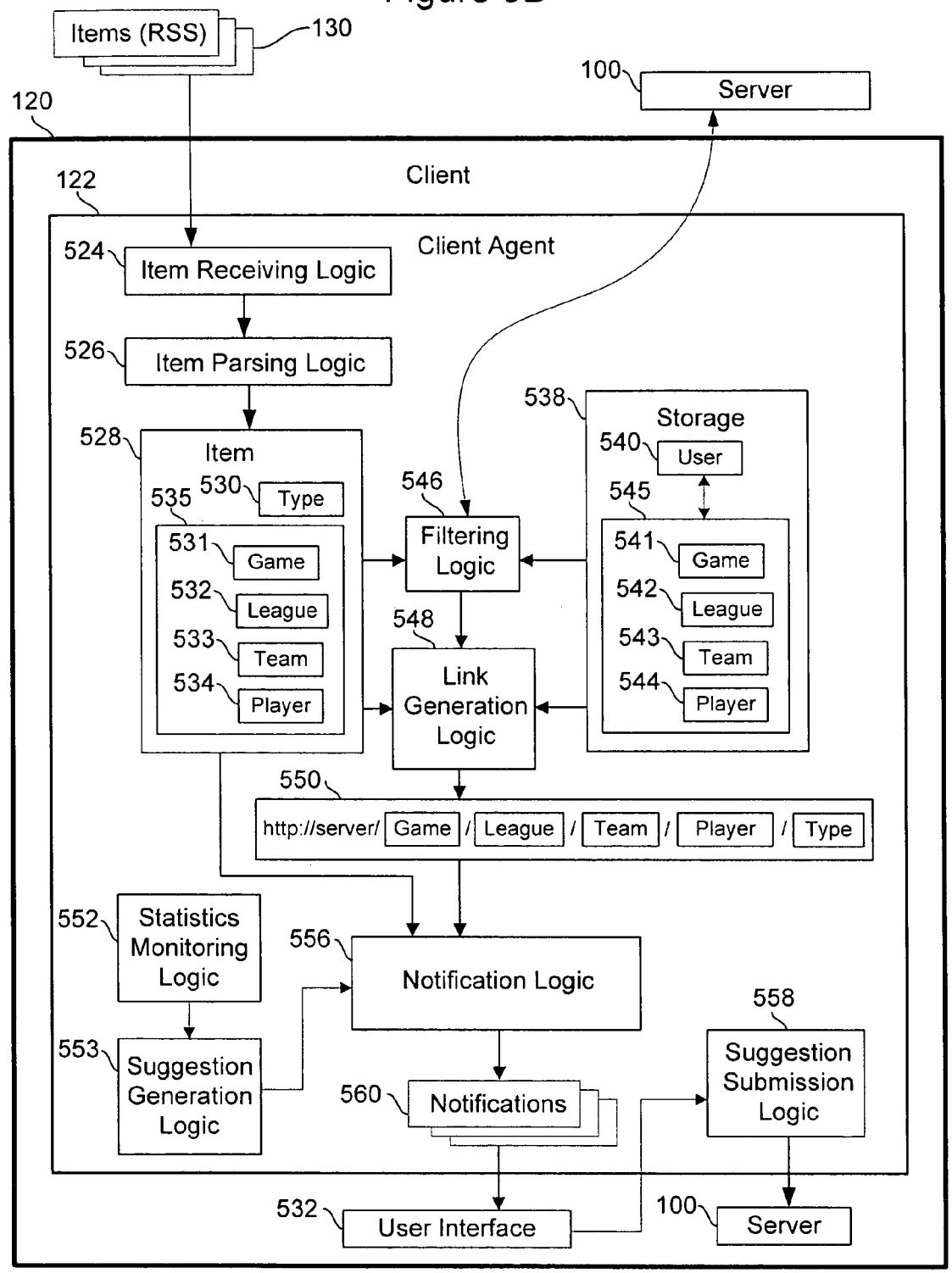
FIG. 5B is an illustrative drawing of components of a client agent in accordance with some embodiments of the invention.

FIG. 5B is an illustrative drawing of components of a client agent in accordance with some embodiments of the invention. The client agent 122 may be, for example, a computer-executable widget, such as a widget based upon the Yahoo!® Widget Engine, or a program implemented in a programming language such as Java™ or JavaScript™. The client agent 122 executes on the client 120 and receives items from the network 115 as shown in FIG. 1. In one aspect, the agent 122 receives RSS Items 130 and delivers, presents, or displays the contents of the RSS Items 130 to a user as notifications 560 via a client user interface 532. The agent 122 may query the item generator 102 of FIG. 5A for the items, periodically or in response to certain events, or may receive the items asynchronously from the item generator 102, which ordinarily runs on the server 100. Note that although the notifications 560 are shown separately from the RSS Items 130, the notifications 560 and items 130 may be combined into a single entity if desired, for example, if the client user interface 532 is capable of translating the RSS Items 130 directly to the appropriate format for display or presentation. For example, the RSS Items 130 could be used in place of the notifications 560 to deliver, present, or display the contents of the RSS Items 130 to the user. That is, the notifications 560 could be the same as the RSS Items 130.

The agent 122 displays the RSS Items 130, including the description 412 and a URL (i.e., web link) generated from the GUID 411 shown in the RSS Item Format 406 of FIG. 4. The agent 122 receives information in the form of the RSS Items 334 from an RSS feed 513 provided by the server 100 shown in FIG. 5A. The user may configure the RSS feed 513 as part of the configuration of the user's fantasy sports team. As part of that configuration, the user may configure the particular types of information that will be made available as items, i.e., published, for the user's team(s) by selecting particular types of information to be displayed. The types of information available as items include, for example, information related to the status of a team's roster, such as roster changes (e.g., adding or dropping of players from the team), roster problems (e.g., incomplete roster), trades of players between teams, news stories published within a certain time period (e.g. the last seven days) which are relevant to players on the team (e.g., a player injury), messages from other users, and suggestions for adding, dropping, or changing players. A user may request to be notified of the occurrence of some, all, or none of the item types by setting appropriate configuration options.

According to one aspect, the agent 122 is a Yahoo!® Widget Engine widget which subscribes to the user's fantasy team RSS feed. The widget periodically checks the RSS feed for new, i.e., not previously displayed, RSS Items 130 and displays any new items to the user. When no new items are available, the widget remains in a minimized or hidden state, e.g., with a lighter visual treatment and able to be hidden below other windows. When new RSS Items 130 become available, the widget transitions into a notify state, in which the widget has a more prominent user interface, e.g., with a bolder visual treatment and able to remain visible above other windows. The widget displays the information received in the RSS Items 130 in a list, e.g., as a list of headlines, where each headline corresponds to one of the RSS Items 130. A user can expand each headline, e.g., by clicking on it, to display the description and call to action associated with the corresponding item. The description and call to action may include web links, e.g., a link to a story on the Yahoo!® Sports web site, and a link to a page for taking a suggested action to respond to the item, respectively. The widget may display headlines for a subset of the received RSS Items 130, e.g., the most recent items, or the items not yet expanded by the user. In both the hidden state and the notify state, the widget displays the most recent items, and a historical list of items is available in an extended view.

The agent 122 is not limited to use with items in the RSS format. The agent 132 may access fantasy sports items in other formats, e.g., name-value pairs or comma-separated values, and may use other protocols in place of RSS, e.g., a TCP/IP-based push protocol.

With respect to FIGS. 1 and 5B, the client agent 122 generates notifications of fantasy sports events by converting items 130 received via a network 115 from an item generator 102 for presentation to a user 133 via a user interface 532. The client agent 122 includes item receiving logic 524 to receive the items 130, item parsing logic 526 to retrieve data values from the items 130, memory storage 538, which includes memory storage for at least one current item 528, memory storage for at least one user identifier 540, and memory storage for at least one stored sports identifier 545 associated with each user identifier 540. The client agent 122 also includes filtering logic 546 for determining if the current item 528 is relevant to, i.e., should be presented to, the user, link generation logic 548 for generating a call to action link 550 based upon the item 528, and notification logic 556 for generating the notifications 560. The client agent 122 also includes statistics monitoring logic 552 and suggestion generation logic 553. The statistics monitoring logic 552 and suggestion generation logic 553 are similar to the server-side statistics monitoring logic 542 and suggestion generation logic 543, respectively, which are described above with reference to FIG. 5A.

When a suggestion is generated by the suggestion logic 553, the user interface 532 presents the suggestion to the user and asks the user to accept or reject the suggestion. If the user accepts the suggestion, the suggested action, e.g., adding a player to a user's team, should be performed. If the user rejects the suggestion, the suggested action will not be performed. The client agent 122 includes suggestion submission logic 558, which may submit accepted suggestions to the server 100, e.g., by sending a message from the client agent 122 via the network 115 of FIG. 1. The server 100 will perform the action upon receiving the suggestion submission message.

The item parsing logic 526 may be, for example, an XML parser and associated logic for parsing the data values described by the RSS Item format 406 of FIG. 4, e.g., the title 410, GUID 411, and description 412, from the RSS Items 130. For example, the item receiving logic 524 may receive an RSS Item 130 from the server 100, retrieve an XML document from the RSS Item 130, and retrieve the title 410, GUID 411, and description 412 data values from the parsed XML document. Once the data values have been extracted, the notification logic 556 may generate the notifications 560, which contain the data values.

The filtering logic stores the most recent sports identifier 535 associated with each user in the memory storage 538 as a sports identifier 545 associated with the user 540. The sports identifier 545 is stored in association with the user 540 so that the filtering logic 546 and link generation logic 548 can retrieve the sports identifier, i.e., the game 541, the league 542, the team 543, and the player 544, associated with a particular user 540 to determine if the current item 528 is relevant to the user, or to generate the link 550.

In one aspect, the filtering logic 546 determines if the current item 528 is presentable to a particular user by comparing components of the current sports identifier 535 to corresponding components of the stored sports identifier 545 associated with the user 540. For example, the filtering logic 546 may determine that the current item 528 is relevant if the league identifier 532 is equal to the league identifier 542 associated with the user 540. If the filtering logic 546 is present, then the notifications 560 are only generated by the notification logic 556 for items 130 that the filtering logic 546 determines to be relevant to the user. In other examples, the filtering logic 546 may filter items using a condition based upon the set of players on the user's team. In one aspect, the filtering logic 546 may filter the items 130 by comparing the name or identifier of each player 534 referenced in the item 528 to the name or identifier 544 of players on the user's team. If the player names or identifiers match, then the item is relevant to the user and may be displayed as one of the notifications 560 by the user interface 532.

The link generation logic 548 generates the link 550 by combining a protocol name and a server name with the game 531, the league 532, the team 533, the player 534, and the type 530. The protocol name is, for example, "http", and the server name is an Internet host name of the server, e.g., "server", as shown in the link 550. For example, the link may be generated by the following statement:

Link='http://fantasysports.yahoo.com/fantasy/1.0/games/'+game+'/leagues/'+league+'/teams/'+team+'/'+type+'/'+player In that example, the server name is fantasysports.yahoo.com, and the variables game, league, team, type, and player represent the game 531, the league 532, the team 533, the type 530, and the player 534, respectively. The type may be, for example, "add", to indicate that the type is "add player".

In one aspect, the filtering logic 546 and the memory storage 538 are optional features of the agent 122. If the server 100 performs filtering, i.e. only sends items 130 that are relevant to the user of the agent 122, then the filtering logic 546 may be omitted from the agent 122. Furthermore, if the server includes a league 532 in each of the items 130, and the server 100 performs filtering, then the memory storage 538 may be omitted, since the primary use of the storage 538 is to store and retrieve the fantasy sports identifier 545 or at least the league identifier 542 associated with a given user identifier 540.

The agent 122 may include suggestion generation logic 553, which performs processing based upon the RSS Items 130 to suggest actions for improving the user's team. In one aspect, the suggestion generation logic 553 is similar to the server-side suggestion generation logic 543 of FIG. 5A. As described above with reference to FIG. 5A, the suggestion generation logic 553 may execute on the server 100 or the client 120. The suggestion generation logic 553 may include lineup monitoring logic, e.g., to logic determine player rankings or projected points, which is relatively computationally intensive. For example, the lineup monitoring logic portion of the suggestion generation logic 553 may execute on the client 120 for architectural reasons. Executing that logic on the client 120 distributes the computational overhead, so that instead of the server(s) 100 executing that logic for every fantasy team, each user's machine monitors the team(s) associated with that user individually. Executing that logic on the client 120 is likely to reduce the user-specific computational load on the server 100.

Figure 6A:
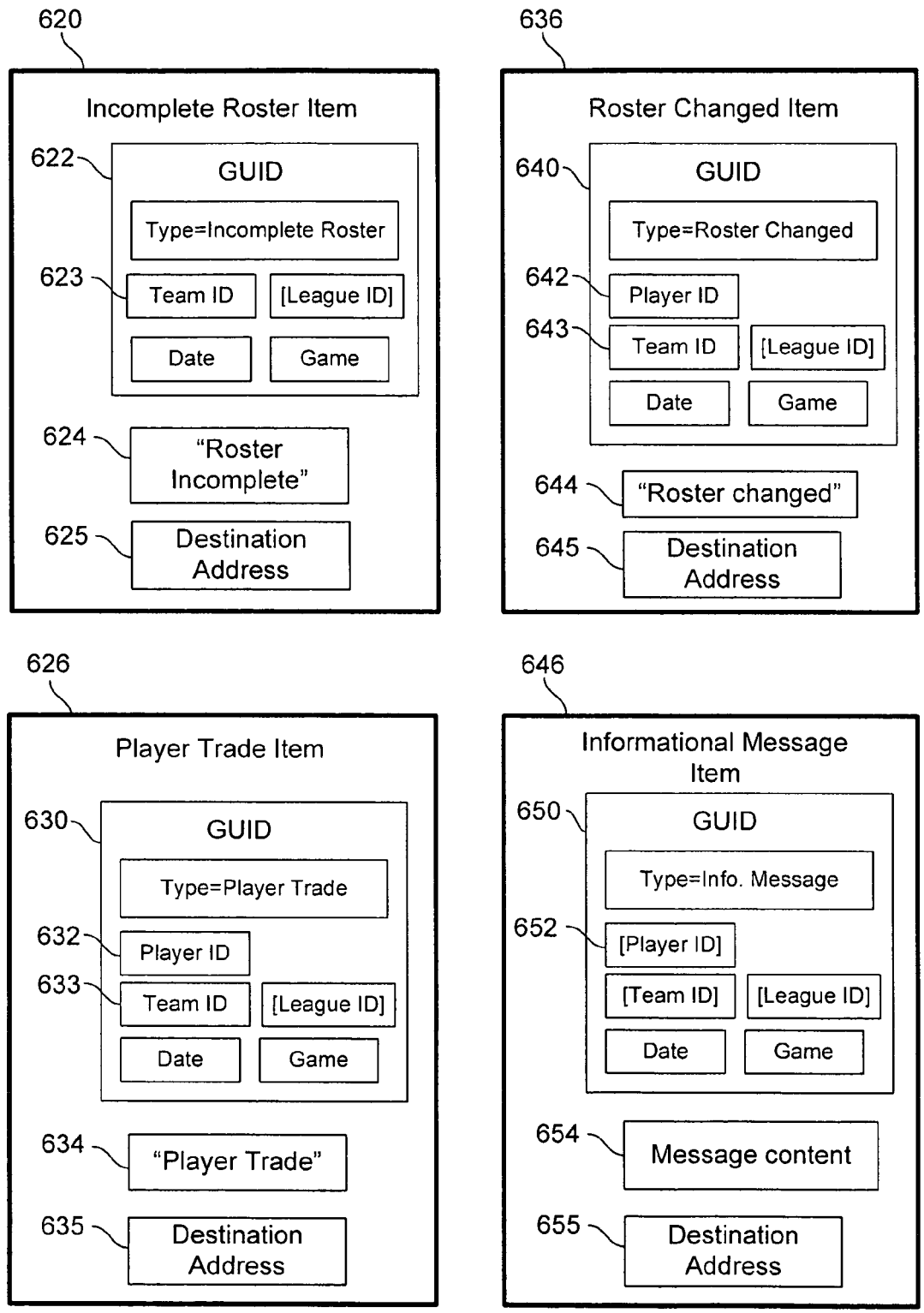
FIGS. 6A and 6B are illustrative drawings of item types in accordance with some embodiments of the invention.
Figure 6B:
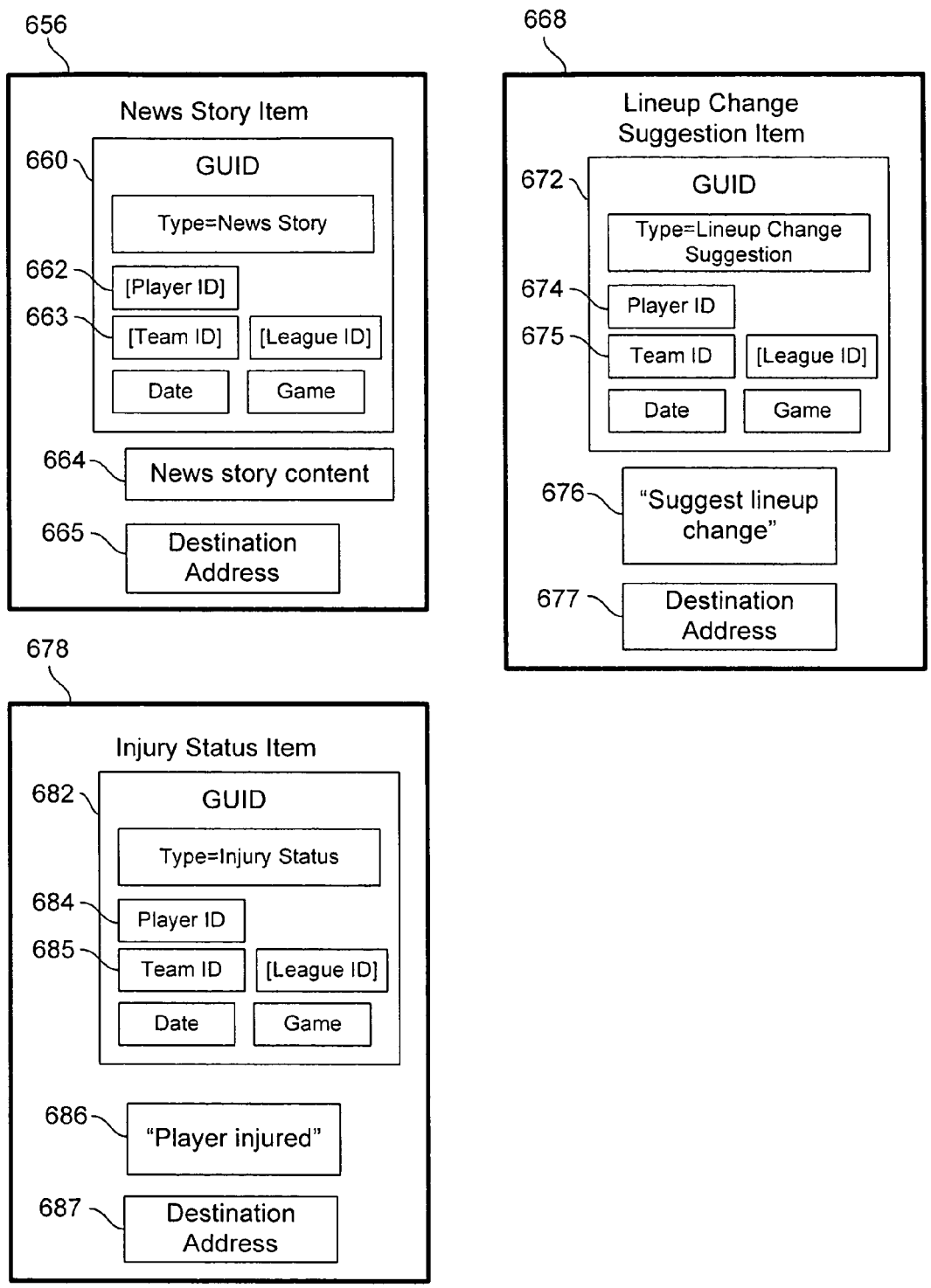

FIGS. 6A and 6B are illustrative drawings of item types in accordance with some embodiments of the invention. Each item type corresponds to a type of event related to the fantasy sports game. Each of the items 511 shown in FIG. 5A is an instance of an item type. Each of the item types defines a type of item that may be generated and delivered to a user of a team, player, or league if a condition associated with the item becomes true, such as when an event related to the fantasy sports game occurs.

The suggestion generation logic 553 of FIG. 5B may be invoked in response to one of the notifications 560 or one of the items 130. For example, the suggestion generation logic 553 may be invoked in response to receipt of a roster changed item 636 of FIG. 6A or an injury status item 678 of FIG. 6B, to suggest one or more alternative lineups that are likely to improve the performance of the user's team. The suggestion generation logic 553 may also be invoked by the user to review prior notifications and review suggested actions. Prior notifications and suggested actions are ordinarily presented by the user interface 532 as lists on the display of the user's computer.

The suggestion generation logic 553 may also suggest adding individual players to the user's team, where those players are likely to improve the performance of the team. For example, the suggestion generation logic 553 may search for a desirable player with a larger number of projected points than other players on the user's team, and may generate a suggestion for adding the desirable player, and, if the player is on another team, may generate a trade suggestion that suggests trading one or more of the players on the user's team for the desirable player. The suggestion generation logic 553 may also search for a desirable player with the highest ranking, and may generate a suggesting for adding the desirable player.

Note that the suggestion generation logic 553 executes on the client 120 of FIG. 1. The item generation logic 510 may also generates suggestions, e.g., lineup change suggestions, as described in FIGS. 7C and 7D, which are illustrative flowcharts of item generation logic in accordance with some embodiments of the invention. The item generation logic 510 typically executes on the server 100. In one aspect, each type of suggestion may be generated by either the item generation logic 510 or the suggestion generation logic 553. The suggestion generation logic 553 executing on the client 120 may generate suggestions, e.g., lineup change suggestions, as described in FIGS. 7C and 7D, by performing computations based on data provided by the server 100, e.g., provided by the item generation logic 510. The suggestions may be generated by the item generation logic 510 on the server, in which case the server may include the suggestions in the items 130 transmitted to the clients, or the suggestions may be derived by the suggestion generation logic 553 on the client 120 from data contained in the items 130. The choice between generating an item on the server 100 or generating an item on the client 120 may be made on a per-item basis, e.g., by the item generation logic 510, based upon information determined at runtime such as load information or configuration parameters.

In one aspect, the notification logic 556 generates the notifications 560, which may be, for example, data values or objects in computer memory, by translating the current item 528 to a notification 562. The notification logic may add a suggestion (not shown) generated by the suggestion generation logic 553 to the notifications 560, and may also add the link 550 generated by the link generation logic 548 to the notifications 560.

The user interface 532 may be based upon the Yahoo!® Widgets user interface toolkit, or upon HTML, JavaScript™, or the like. The user interface 532 may use the Yahoo!® Widget Engine to display the notifications 560. The client agent 122 may be a Yahoo!® Widget based upon the Yahoo!® Widget Engine. Yahoo!® Widgets are implemented in JavaScript™ and XML, as described in the document "Yahoo!® Widget Engine 3.0 Reference Manual", Dec. 7, 2005, available from Yahoo!® Inc.

Figure 5C:
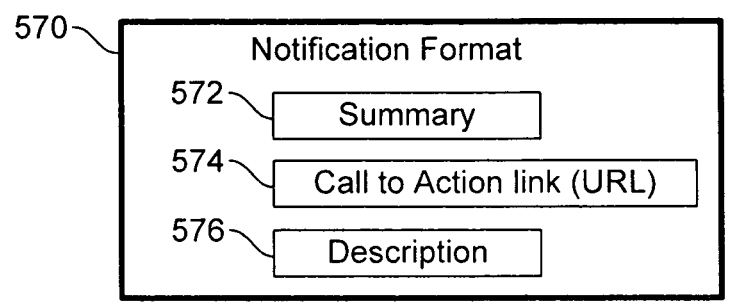
FIG. 5C is an illustrative drawing of a notification data format in accordance with some embodiments of the invention.

FIG. 5C is an illustrative drawing of a notification data format in accordance with some embodiments of the invention. The notification data format 570 includes a summary 572, a call to action link 574 (e.g., a URL), and a description 576, which are based upon, with reference to FIG. 4, the GUID 402 and the description 404 of the item 400 that triggered the notification. The link 574 is generated by the link generation logic 548 by combining the components of the GUID 402 to produce the link 574 in a format such as the link format 550 of FIG. 5B. The user interface 532 ordinarily displays the notifications 560 on the display of the client 120. The displayed information includes the information in the notification format 570 of FIG. 5C, i.e., the summary 572, the link 574, and the description 576.

Figure 5D:
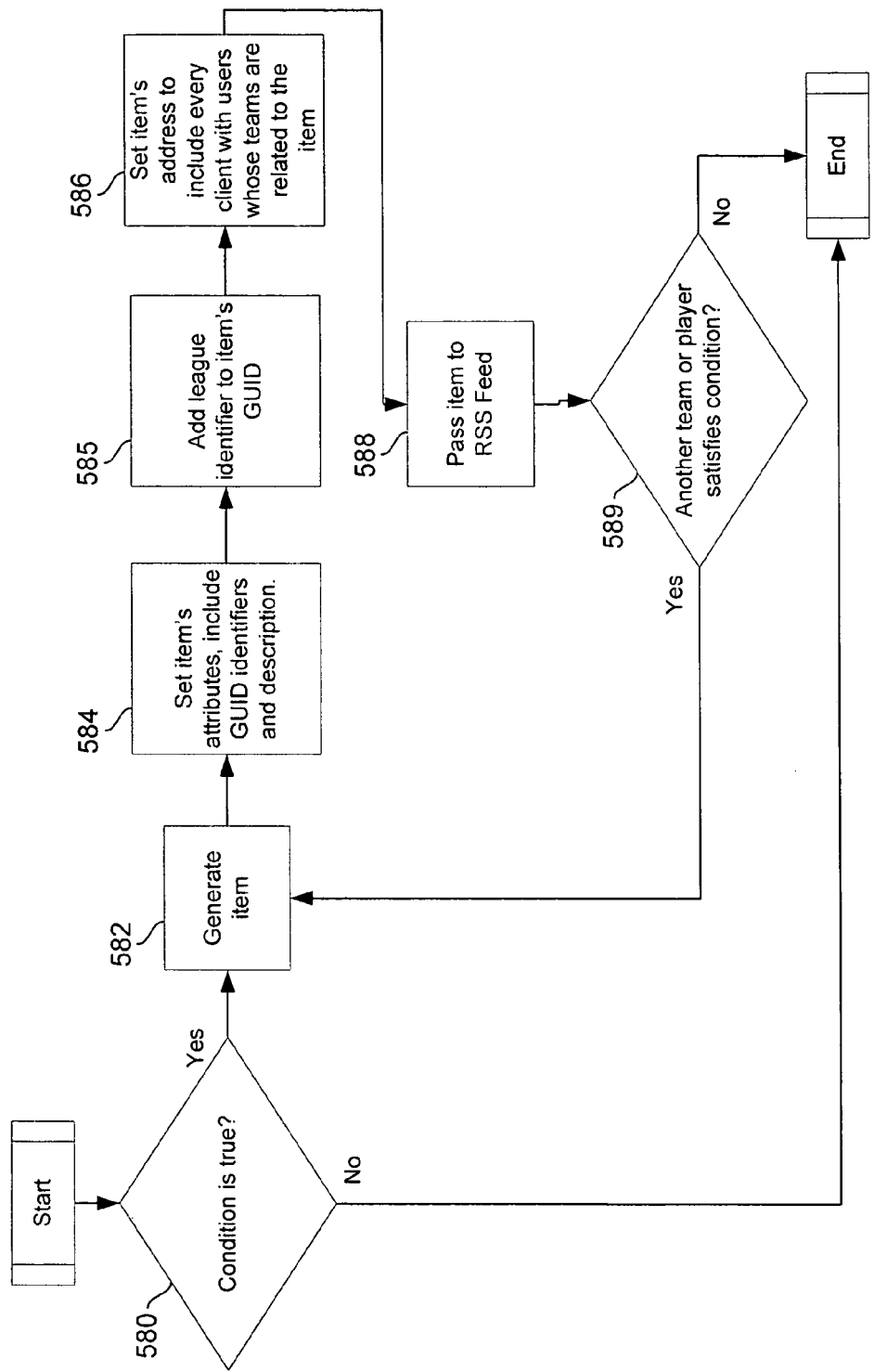
FIG. 5D is an illustrative flowchart of item generation logic for a smart server in accordance with some embodiments of the invention.

FIG. 5D is an illustrative flowchart of item generation logic for a smart server in accordance with some embodiments of the invention. The logic of FIG. 5D and of other flowcharts described herein may be a module, file, function, or subroutine of computer program code. The flowchart begins at block 580 by determining if a condition is true. In one aspect, the condition is based upon information or attributes associated with one or more fantasy sports leagues, fantasy sports teams, sports players, or a combination thereof. The leagues, teams, and players share the common property of being entities in the fantasy sports game. The attributes and other information related to the leagues, teams, and players are available to the item generation logic. The condition is based upon information that may be, for example, performance statistics associated with the leagues, teams, or players, e.g., projected points or rankings of players, or player status, e.g., whether a player is injured, or transactions involving the teams and players, e.g., a trade of a player between two teams.

If the condition is true, block 582 generates an item, which in one aspect is one of the items 511 of FIG. 5A, and conforms to the item format 400 of FIG. 4. Block 582 also sets the item's type 401 to a particular item type, such as Incomplete Roster Item or Player Trade Item. Different item types may be used for different conditions. The items are categorized into types so that a user can control the types of items that will be delivered or displayed, and also because some components of the item format 400, e.g., the attributes 403 and the GUID 402, may be set according to different rules for different conditions.

Block 584 sets the attributes of the item 400, including the GUID 402, the attributes 403, and the description 404, to specific values that are based upon an event that caused the condition to become true. The GUID 402 may be used by the client to generate a link to a web page. A user may interact with the web page to perform an action in response to the item, such as adding a player to the user's team in response to an item suggesting that the player be added. The attributes 403 may be set to the names of the leagues, teams, or players that satisfied the condition of block 580, and to data related to the condition, such as a short text message. The description 404 may be set to a short summary of the condition, e.g., "Suggest lineup change".

Block 585 adds a league identifier to the item's GUID. The league identifier specifies a fantasy sports league in which the event described by the item occurred. For example, if a Player Added event occurs in a fantasy league named National, then block 585 will set the league identifier to a unique identifier that corresponds to the National fantasy league. Block 586 sets the item's address 405 so that the item will be sent, via a client such as the client 120 of FIG. 1, to users of fantasy sports teams that are related to the item, e.g., users of a team that includes a player that is referenced in the item, to users of a team that is referenced in the item, or to users that are referenced in the item. The address 405 may be set to a value that identifies the user, the user's client 120, or both. Block 586 may use information available to the server, such as the leagues, teams, and players in the server resources 504 of FIG. 5A, to determine whether the league, team, or player in the item is related to each user, and if so, to add the address of the user or the user's client to the item's address 405.

Block 586 may set the item's address 405 to a value that will cause the item to be delivered to a specific user or group of users, which may be achieved by setting the address to a team name or to a user name, depending on the requirements of the protocol being used for distributing the item via the network 115. The address 405 may be set to a value acceptable to the RSS Feed 513, the Email Sender 514, or some other sender. Block 588 passes the item to the RSS Feed 513, or to some other sender, to make the item available to the users specified or implied by the address 405. Block 589 determines if another league, team, or player, or combination of those, satisfies the condition of block 580. If so, control is transferred back to block 582 to generate another item for the other league, team, or player, and the process is repeated until an item has been generated for each league, team, or player that satisfies the condition.

Figure 5E:
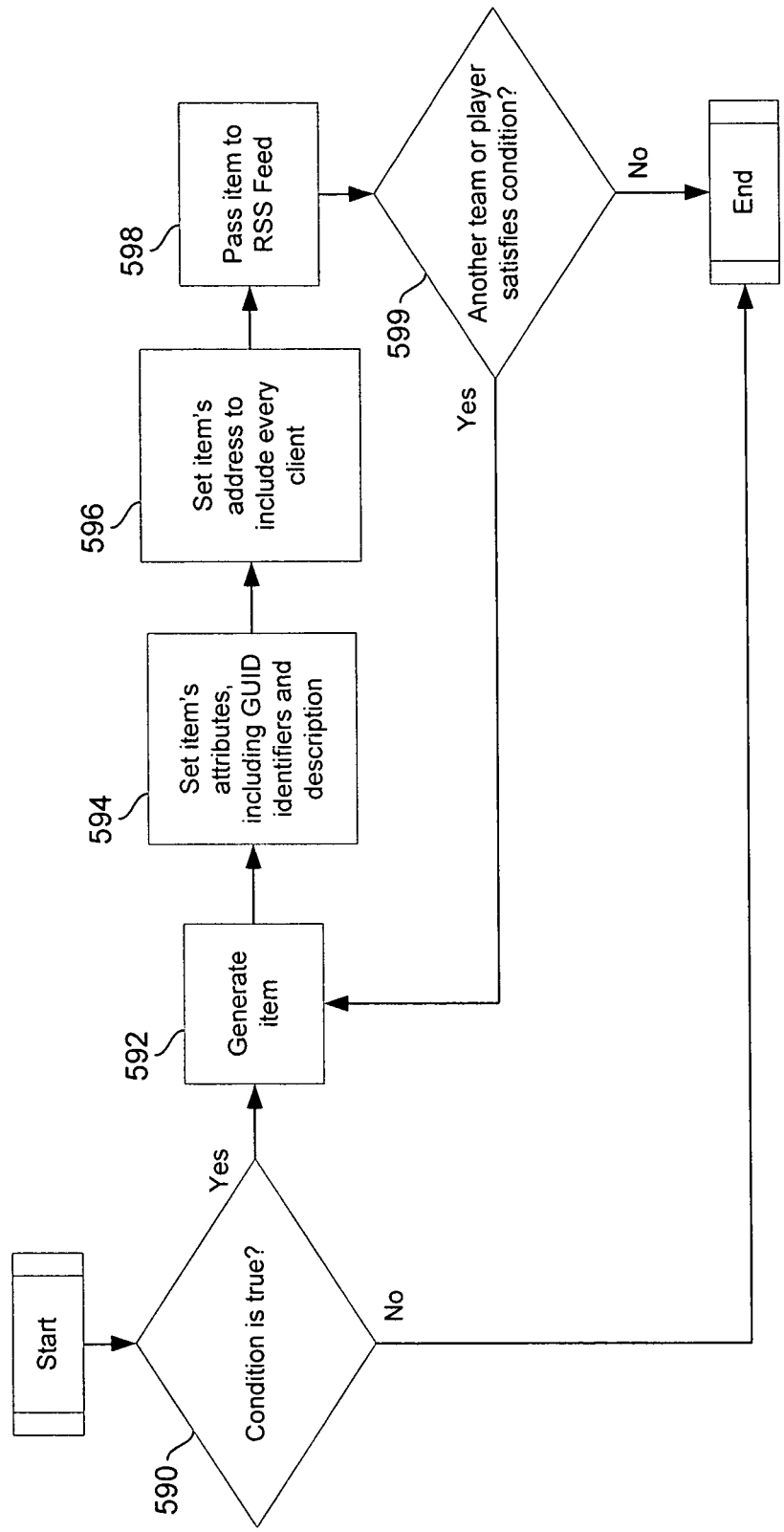
FIG. 5E is an illustrative flowchart of item generation logic for a server in a smart client environment in accordance with some embodiments of the invention.

FIG. 5E is an illustrative flowchart of item generation logic for a server in a smart client environment in accordance with some embodiments of the invention. The flowchart begins at block 590 by determining if a condition is true. The condition is similar to the condition described above with respect to FIG. 5D. If the condition is true, block 592 generates an item as described above for block 582. Block 594 sets the item's attributes, including the GUID 402, the attributes 403, and the description 404, as described above for block 584.

Block 596 sets the item's address 405 to a value, e.g., a broadcast address or the like, that will cause the item to be made available, e.g., via RSS, or sent, e.g., via email, to substantially every user via the network 115. If the item is received by a smart client version of the client agent 122 of FIG. 1, then the smart client agent 122 will determine whether to display the item to the users and will determine the league identifier. The address 405 may be set to a value acceptable to the RSS Feed 513, the Email Sender 514, or some other sender. Block 598 passes the item to a sender, as described above for block 588. Block 599 determines if another league, team, or player, or combination of those, satisfies the condition of block 590. If so, control is transferred back to block 592 to generate another item for the other league, team, or player, and the process is repeated until an item has been generated for each league, team, or player that satisfies the condition.

With reference to FIGS. 6A and 6B, an Incomplete Roster item 620 is a data format that represents an Incomplete Roster event, and is generated by the item generation logic 510 of FIG. 5A for each team that has an incomplete roster. The Incomplete Roster item 620 is a description of a data format that represents the occurrence of an incomplete roster event. The term Incomplete Roster item is also used herein to refer to instances of that data format, e.g., to data objects that may be sent via a network.

A roster is a subset of a fantasy team's players. A roster ordinarily has a number of positions, each of which can be filled with one of the team's players. If at least one of the positions is not filled, i.e., has not been assigned a player, then the roster is incomplete. For example, a team with 20 players may have a roster of 10 starting positions, and if the team has 8 roster positions filled, then an incomplete roster event will occur, and an Incomplete Roster item 620 will be generated. In one example, the item is generated and sent after a small interval of time, e.g., 5 minutes, has elapsed without the roster becoming complete, to allow the user time to complete an incomplete roster without receiving an incomplete roster notification.

The Incomplete Roster item 620 includes a set of attributes. The attributes include a GUID 622, which includes a team identifier 623 that identifies which team that has an incomplete roster, a game identifier that identifies the game to which the item applies, and a date that indicates the date and time at which the item was generated. The item 620 also includes a description 624 that has a value such as "Roster Incomplete", and an address 625, which identifies the intended recipient, e.g., user, for the item 620. Roster-related items, such as the Incomplete Roster Item 620, are generated based upon the current lineup of an active fantasy sports team. In some games, the current lineup may change every day. For example, baseball and basketball games may be played every day. In other games, the current lineup plays on the weekend. For example, fantasy sports football games and automobile races occur once a week.

A roster changed item 636 indicates that the roster of a team has changed. A roster changed item 636 is generated by the item generation logic 510 of FIG. 5A if, for example, a team's roster has changed, which occurs when a player is added to a team, dropped from a team, or the order or positions of active players on the team are changed.

The roster changed item 636 is similar to the Incomplete Roster Item 620, but has a GUID 640 that includes a Player ID 642, which identifies the player(s) involved in the roster change. The attribute values of the GUID 640 can be used by a client to construct a link 640 to a team roster page to allow the user to view the changed roster. The user will have permission to view the changed roster because they will have access to the league information, which includes information for their own team and any other teams in the league of which the user is a member. If a player has been dropped, the link 640 may include a link to a page for adding the player to the user's team. The roster changed item 636 also includes a description 644 that has the value "Roster changed", and a destination address 645 that is set similarly to the destination address 625 described above.

A Player Trade Item 626 is generated by the item generation logic 510 if a trade action occurs. A trade action occurs when a trade of a player from one team to another team, typically in exchange for a player on the other team, has been proposed, accepted, completed, or rejected. A GUID 630 includes a Player ID 632 that identifies the traded player(s) and a Team ID 633 that identifies the teams involved in the trade. The attribute values of the GUID 630 can be used by a client to construct a link to a web page with which the user can interact to accept or reject the trade of the player, if the action is trade proposal. A description 634 has the value "Trade proposed", and a destination address 635 which specifies a recipient for the Item 626. The destination address 635 is typically set to specify names or identifiers of users of teams that are in the same league as the teams involved in the trade.

An Informational Message Item 646 is generated by the item generation logic 510 if a new message has been posted to a public message board, or if a user's smack talk message has changed. A GUID 650 includes information which the client agent can use to generate a link to a web page where the user can view the new public message, or to a web page where the user can change the their own smack talk message. The GUID 650 may also include identifiers for one or more players 652 and teams related to or mentioned in the public message. A description field 654 may include the content of the public message or smack talk message, or a link such as a URL to the content. An address 655 is set to the names or identities of users of teams mentioned in the public message, or to a broadcast-like address of multiple users for a smack talk message, and the Item 646 will be delivered to those users.

A News Story Item 656 is generated by the item generation logic 510 if a news story mentioning a fantasy sports entity such as a fantasy sports team, or a player on a fantasy sports team, received or detected by the item generator 102 of FIG. 1. The Item 656 includes a GUID 660 which indicates that the item's type is News Story. The GUID 660 may also include player identifiers 662 and team identifiers 663 that identify player(s) and team(s), respectively, referenced by the news story. The server 100 may provide an action for adding the player(s) to the user's team, and the GUID 660 may include information for constructing a URL link for invoking the server to perform that action. A description field 664 may include the content of the news story, or a link such as a URL to the content. An address 665 is set so that the item will be delivered to the user(s) of every team mentioned in the news article, and to the user(s) of every team for which a player mentioned in the news story is on the team's roster.

A Lineup Change Suggestion Item 668 is generated by the item generation logic 510 to suggest adding or dropping players from a team. There are at least three situations in which a Lineup Change Suggestion Item 668 may be generated. First, if a player X at the top of the add buzz list, i.e., in one of the highest positions on the buzz list, such as the top position or the top there positions, has been added more than a specified number of times, i.e., has been added to more than a specified number of different teams, and the player X is available to be added to additional teams, then a Lineup Change Suggestion Item 668 is generated, and the item's address 677 is set so that the item will be delivered to users of teams that do not have the player X. A GUID field 672 of the Item 668 indicates that the Item 668 is a Lineup Change Suggestion event, and includes a player identifier 674, which identifies the player X, a team identifier 675 which is set to the identifier of the team to which the Item 668 is to be delivered. The GUID 672 also includes an optional league identifier, which is set to the league identifier of the league associated with the team identifier 675 in the smart client configuration, but is not necessarily set in the smart server configuration. The server 100 may provide an action for applying the lineup change suggestion to the user's team, and the GUID 660 may include information for constructing a URL link for invoking the server 100 to perform that action.

Upon receiving the Lineup Change Suggestion Item 668, the client agent 122 may generate a web link, e.g., a URL, to a web page for invoking action logic provided by the server 110 for applying the suggestion to the user's team, or to a web page for adding the player X to the team of the user who receives the item if the team's roster is incomplete, i.e., not full, or to a Web page for exchanging the player X for another player on the team, if the team's roster is complete, i.e., full.

Second, if a player X at the top of the drop buzz list has been dropped more than a specified number of times, i.e., has been dropped from more than a specified number of different teams, then a Lineup Change Suggestion Item 668 is generated. In the smart server configuration, the item's address 677 is set so that the item will be delivered to the user(s) of teams that have the player X. In the smart client configuration, the item is delivered to every user. In this second case, upon receiving the Item 668, the client agent 122 may generate a web link from the GUID, where the web link that refers to a web page provided by the server 100 for dropping the player X from the team of the user who receives the item.

Third, if a non-starting candidate player such as a benched player or a free agent player has better statistics than a starting player on a team X, then a Lineup Change Suggestion Item 668 is generated. In the smart server configuration, the item's address 677 is set so that the item will be delivered to the user(s) of the team X. In the smart client configuration, the item is delivered to every user. In this third case, upon receiving the Item 668, the client agent 122 may generate a web link that refers to a web page provided by the server 100 for adding the benched or free agent player to team X's lineup, and, if team X's lineup is already full, the web page may allow the user to drop the starting player whose statistics were found to be worse than the benched player or free agent. In that worse statistics case, the web page may be a page for exchanging the starting player with the benched player or free agent. In the above cases, a description 676 is set to the value "Suggest lineup change".

An Injury Status Item 678 is generated by the item generation logic 510 if the injury status of a player X changes, i.e., if a report is received indicating that a non-injured player has become injured, or that an injured player has become non-injured (i.e., healed). A GUID 682 indicates that the item's type is Injury Status. The GUID 682 also includes a player identifier 684 which identifies the injured or non-injured player, and a team identifier 685 which is set to the team for which the player plays. The server 100 may use the information in the GUID 682 to provide a Web page or a Web service for performing an action related to the injured player, such as removing the player from the user's team's starting lineup, or, if the player is no longer injured, for adding the player to the user's team. An address 687 is set so that the item will be delivered to the user(s) of the team X. The player's injury status is ordinarily based on the real-life injury status of the player. Upon receiving the Item 678, the client agent 122 may generate a web link that refers to the Web page or Web service provided by the server for performing an action related to the injured player.

In another aspect, the player's injury status may be received in a news story. The News Story Item 656 can also represent the injury status of a player. In one aspect, an injury of player may be reported to a user by a News Story Item 656, in which the link 660 is a link to a news story describing the injury, and the player name 662 is optionally set to the name of the injured player.

FIGS. 7A-7F are illustrative flowcharts of item generation logic in accordance with some embodiments of the invention. FIGS. 7A-7F illustrate at least one possible implementation of the item generation logic 510 of FIG. 5A. The logic illustrated in the flowcharts of FIGS. 7A-7F may be executed by the server 100 whenever a user action occurs, or whenever content, such as a news story or statistics for a player, is received from at least one of the content data feeds 109. The logic of FIGS. 7A-7F may also be implemented using callback functions which would be registered with logic in the server and called by the server when the associated actions occur. The callback function approach, although slightly different in implementation details from the flowcharts shown in FIGS. 7A-7F, would still essentially employ conditional comparisons and associated logic similar to those shown in the flowcharts.

Figure 7A:
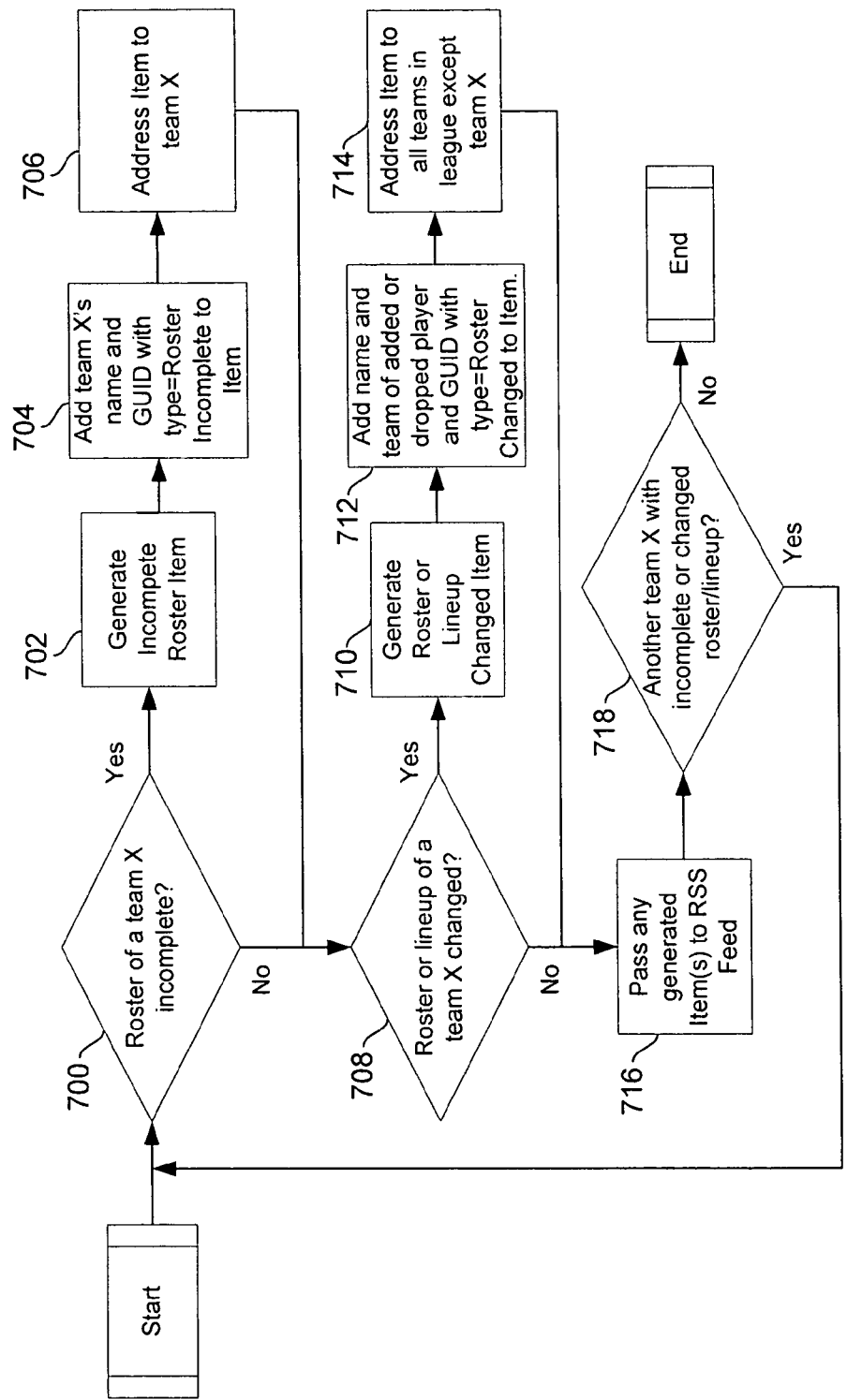
FIGS. 7A-7F are illustrative flowcharts of item generation logic in accordance with some embodiments of the invention.

FIG. 7A is an illustrative flowchart of item generation logic for generating team roster-related items. The flowchart begins at block 700 by determining if the roster of a team X is incomplete, e.g., does not have the number of players required by the rules of the game. This determination is made by consulting the roster status 521 of the item generator 102 of FIG. 5A. If there is no team X with an incomplete roster, then control is sent to block 708. If there is a team X with an incomplete roster, then block 702 generates an Incomplete Roster item 620 of FIG. 6A and sets the content 624 of the item to "Roster Incomplete". The number of players missing from the roster may also be included in the content 624. Note that the term "team X" is used herein to refer to a team whose identity is determined when the flowchart is executed, i.e., at runtime. Block 704 fills in the elements of the new Incomplete Roster item 620 of FIG. 6A by setting the team identifier 623 of the GUID 622 to identify team X. Block 704 also sets the type of the item's GUID 622 to "roster incomplete. The client agent 102 of FIG. 1 may translate the roster incomplete GUID to a link to a web page for adding a player to the user's roster. Block 706 addresses the item to the team X by setting the destination address field 625 to the desired address, which in this case includes each user of team X, so that the item will be delivered to the user(s) associated with team X. Other addressing techniques are possible. For example, the destination address 625 may be set to a channel identifier associated with the user of the team, or to a TCP/IP network address of a client application program that interacts with the user.

Blocks 708-714 of FIG. 7A generate a Roster Changed Item if a fantasy or real-life team's roster has changed. In the case of fantasy team lineup changes, the Roster Changed Item will ordinarily be addressed to users of all teams in the same league as the team whose lineup has changed. In the case of real-life lineup changes, the Roster Changed Item will be addressed to users of all teams that have the affected players in their lineup. Block 708 determines if the roster of a fantasy or real-life team X has changed, e.g., a player has been added or dropped, or if the team's lineup has been modified. This determination is made by consulting the roster status 521 of the item generator 504 of FIG. 5A. If no team rosters have changed, then control transfers to block 716. If the roster of a team has changed, then a Roster Changed item 636 of FIG. 6A is generated at block 710. Block 710 may also add a description of the roster change, such as "Roster changed of team X changed: Player Y added, player Z dropped from roster." Block 712 adds the identity of the changed team to the item 636 by setting the team ID 643 to identify the team whose roster has changed. Block 712 may also set the player ID 642 to identify the player(s) affected (e.g., added or dropped) by the roster change. Block 712 also sets the type of the GUID 640 to "roster changed". Block 714 addresses the item to users of all teams in the league, or, in the case of a real-life lineup change, to the team identifiers of all teams whose starting lineups include the players involved in the real-life lineup change. Addressing the item involves setting the destination address field 645 to the desired address, which may be a user identifier, e.g., a numeric user identifier, a user name, a client host address, or some other address associated with the user. Block 716 passes any items that were generated in the previous blocks to the RSS Feed 513 of FIG. 5A, which makes the items available to clients. For example, the items may be sent to the client agent 122 of FIG. 1 by the item transmission logic 512. Block 718 searches for another team that has an incomplete or changed roster or lineup. If another such team is found, it becomes the new team X, and execution of the flowchart is repeated, starting at block 700.

Figure 7B:
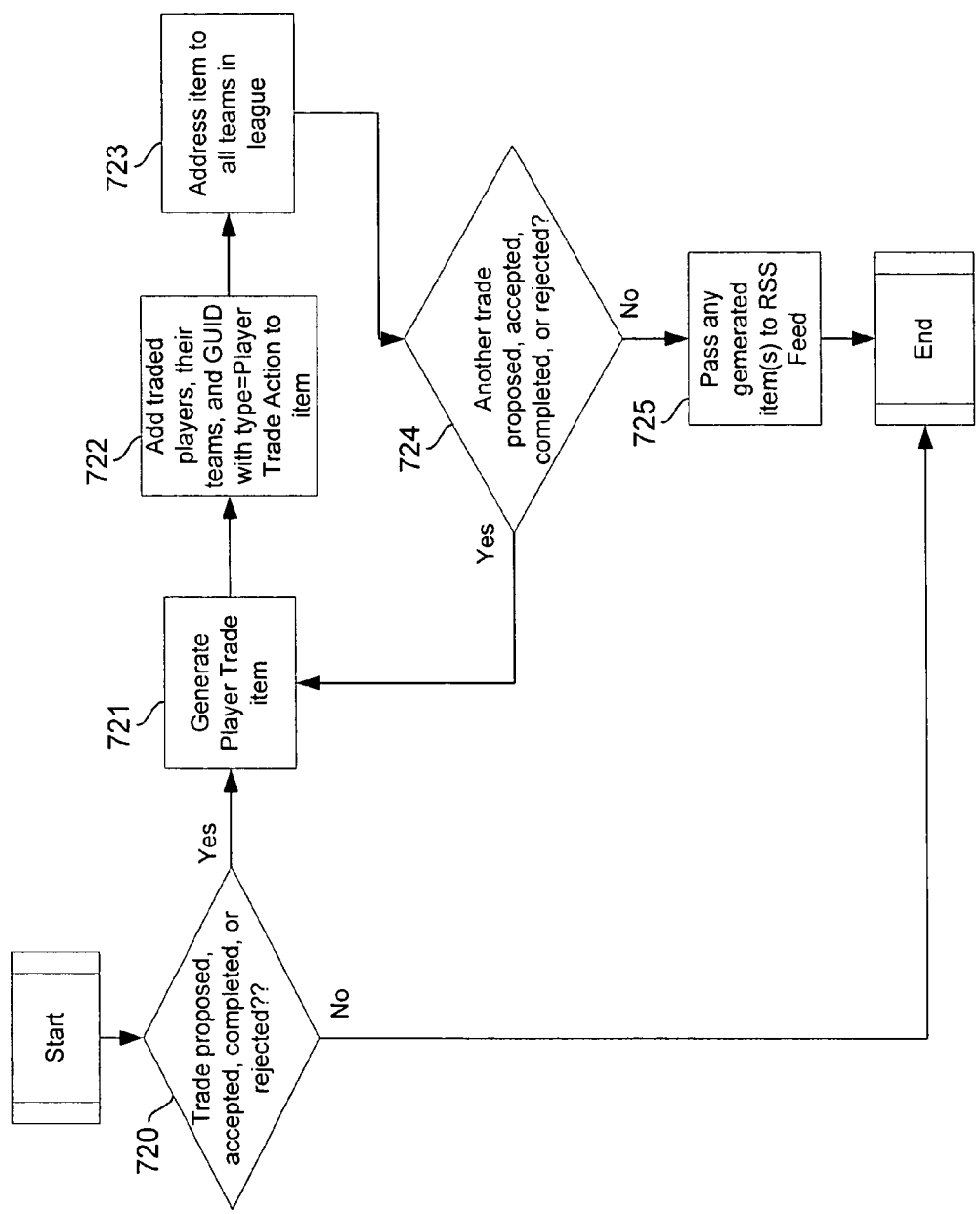

FIG. 7B is an illustrative flowchart of item generation logic for generating player trade items. Block 720 determines if a trade action has occurred, such as proposal, acceptance, rejection, or completion of a trade. If a trade event has occurred, block 721 generates a Player Trade Item 626 of FIG. 6A. Block 721 may also set the message content 634 to a description of the player trade event, such as "Team X proposed trade of their player Y for your player Z" or "Team X traded their player Y team W's player Z". The content 634 should include "Trade proposed", "Trade Accepted", "Trade Rejected", or "Trade Completed" in accordance with the type of trade action.

Block 722 sets the player ID 632 and the team ID 633 of the GUID 630 to identify the player(s) and team(s) involved in the trade. Block 722 also sets the type of the item's GUID 630 to "player trade proposal", "player trade acceptance", "player trade completion", or player trade rejection", depending on the type of trade action. If the action is a trade proposal, the client agent 122 of FIG. 1 may use the GUID 630 to generate a link (i.e., URL) that refers to a web page provided by the server 100 which the user can interact with to accept or reject the trade. If the action is a trade acceptance or completion, the client agent 122 may generate a link to a web page which shows the user's team's roster. If the action is a trade rejection, the client agent may generate a link to a web page with which the user can interact to propose another trade."

Next, block 723 sets the address 635 to include a special identifier that corresponds to all users in the league, so that all users will be informed of the trade action. Block 724 checks for another trade action, and, if another trade action has occurred, control is sent to block 720 to repeat the process. If no further actions have occurred, block 725 passes the item to the RSS Feed 513 of FIG. 5A.

Figure 7C:
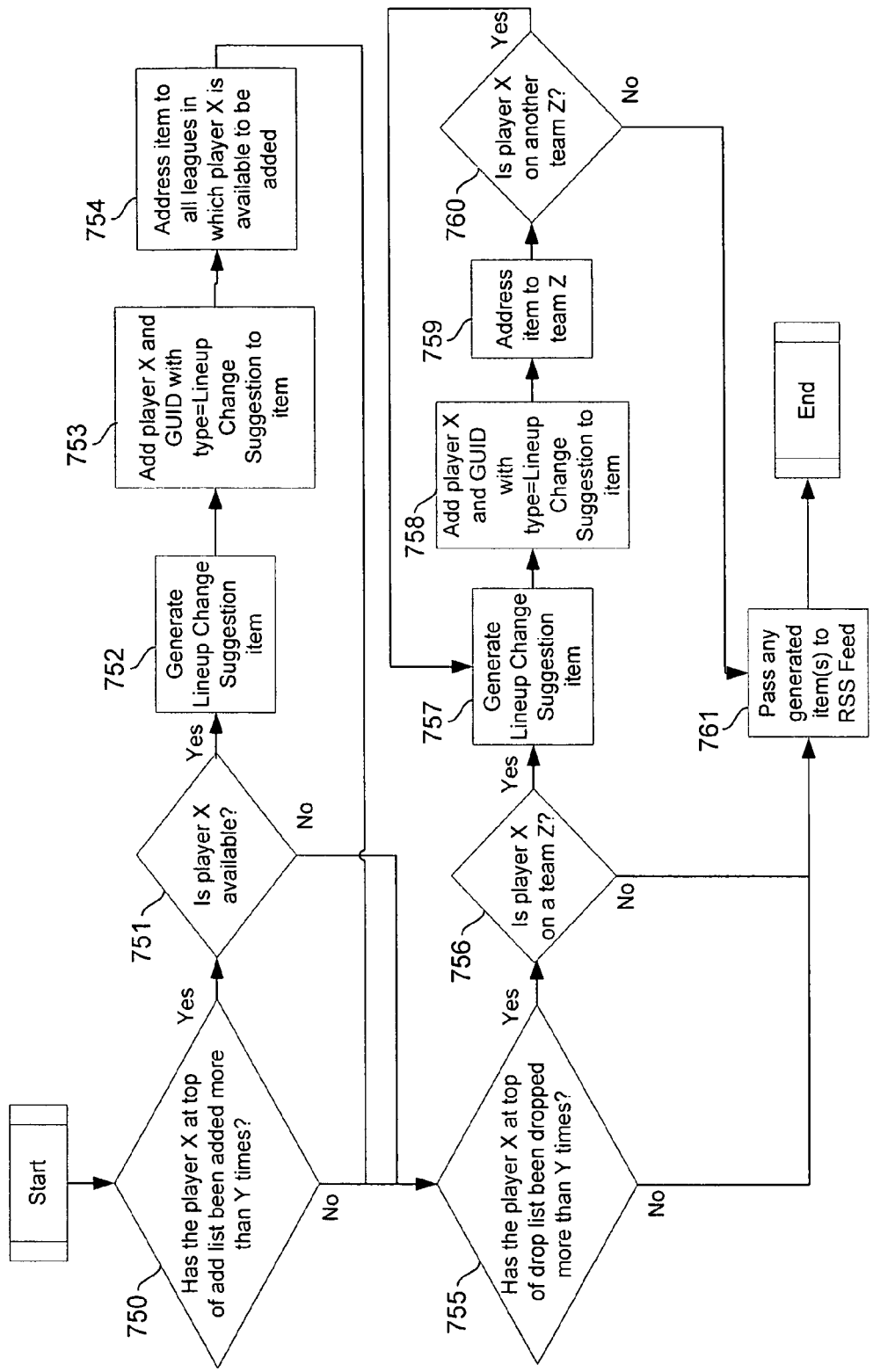

FIG. 7C is an illustrative flowchart of item generation logic for generating lineup change suggestion items based upon buzz lists. First, block 750 determines if the player X at the top of an add buzz list has been added more than Y times within a certain time period, e.g., during the time that has elapsed since the previous game. The time period is typically the time between games, e.g. one day for baseball and basketball, and one week for football and automobile racing. The add buzz list 515 of FIG. 5A ranks the players by the number of times that they have been added to different teams. The player at the top of the add buzz list is the player who has been added to the most teams within a certain time period. If the player X has not been added more than Y times, then control is sent to block 755. If the player X has been added more than Y times, then block 751 determines if the player is available. If the player is not available, control is sent to block 755. If the player is available, block 752 generates a Lineup Change Suggestion item 668 of FIG. 6B. Block 752 also sets the message content 676 to a description of the suggestion such as "Suggest adding player X because of high add buzz rating". Block 753 then sets the player identifier 674 of the GUID 672 to identify player X, and sets the type component of the GUID 672 to "lineup change suggestion". Block 754 sets the destination address 677 to include the identifiers of users that do not have player X on their teams, so that those users will be informed of the add player suggestion.

Blocks 755-760 generate a Lineup Change Suggestion item which suggests dropping a player that is at or near the top of a drop buzz list, and sends the item to teams that have the player. First, block 755 determines if the player X at (or near, e.g., in the top three positions) the top of the drop buzz list has been dropped more than Y times within a certain time period, e.g., since the previous game. The drop buzz list, which is included in the buzz list 514 of FIG. 5A, ranks the players by the number of times that they have been dropped from teams. The player at the top of the drop buzz list is the player who has been dropped from the most teams within a certain time period. If the player X has not been dropped more than Y times, then control is sent to block 761. If the player X has been dropped more than Y times, then block 756 determines if the player is on a team Z. If the player is not on a team Z, control is sent to block 761. If the player is on a team Z, block 757 generates a Lineup Change Suggestion item 668 of FIG. 6B and sets the content 676 of the item to a description such as "Suggest dropping player X because of high drop buzz rating". Block 758 then sets the player identifier 674 to identify the player X, and sets the type of the GUID 672 to "lineup change suggestion". Block 759 sets the destination address 677 to the user identifiers of users of team Z, so that the user of team Z will be informed of the drop player suggestion. Block 760 determines if the player X at the top of the drop list is on another team different from the team Z previously found in block 755. If the player X is on another such team, then that team becomes the new team Z, and control transfers back to block 757 to generate an item to send to team Z. If the player X is not on another such team, then control transfers to block 761, which passes any items that were generated to the RSS Feed 513 of FIG. 5A.

Figure 7D:
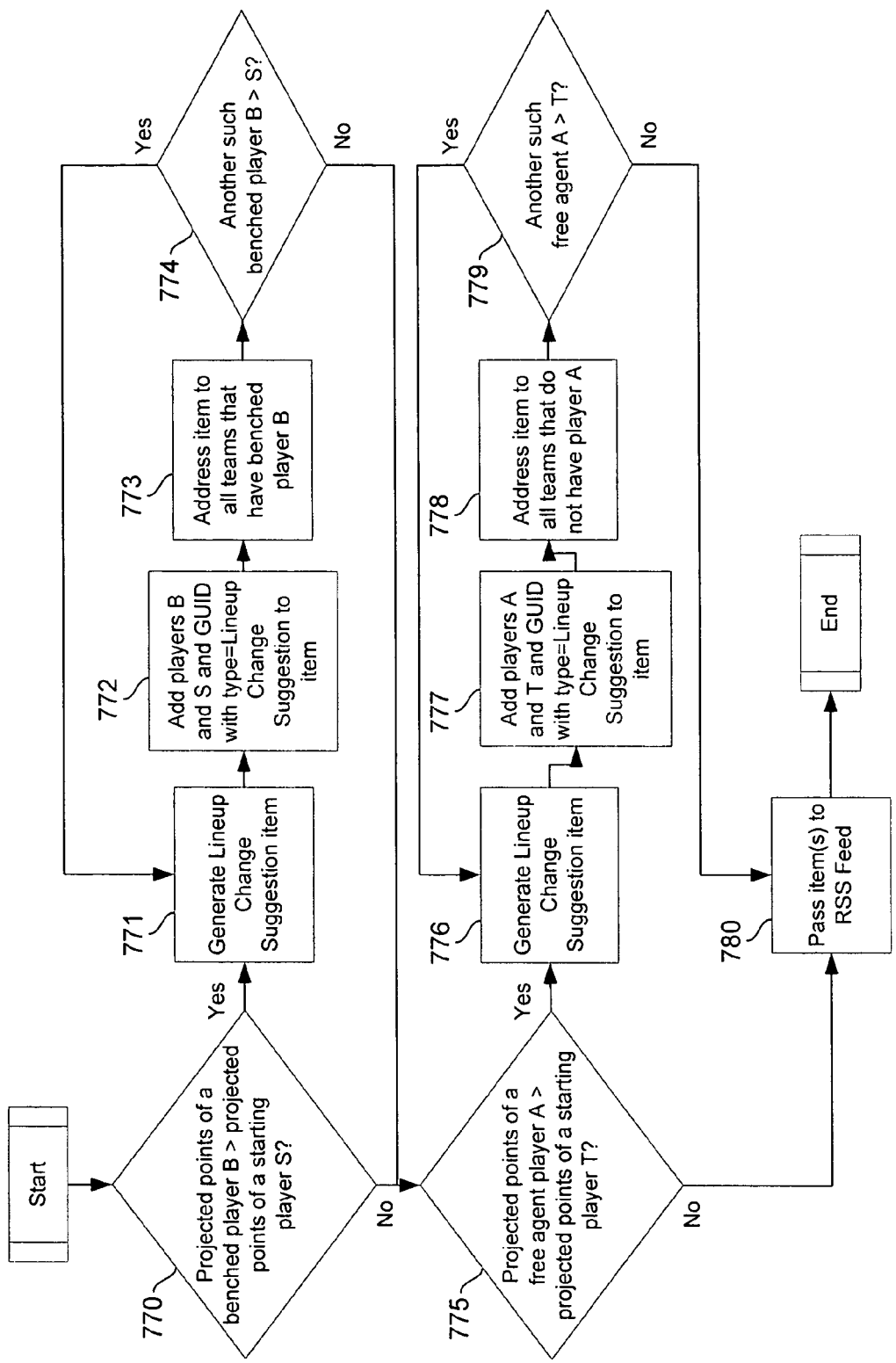

FIG. 7D is an illustrative flowchart of item generation logic for generating lineup change suggestion items based upon projected points. Block 770 determines if the projected points of a candidate benched player B are greater than the projected points of a starting player S. If there is no such benched player B, then control passes to block 775. If there is such a benched player B, then block 771 generates a Lineup Change Suggestion item 668 of FIG. 6B. Block 771 also sets the description 676 to "Suggest exchanging starter S with benched player B", where S is the name of the starting player, and B is the name of the benched player identified by block 770. Block 772 then sets the player identifier 674 to identify the players B and S, and sets the type of the GUID 672 to "lineup change suggestion". The client agent 122 of FIG. 5A may, upon receiving the item 668, generate a link to a page for exchanging player B for player S. Block 773 sets the destination address 677 to include the user identifiers of users of teams that have player S as a starter and do not have player B as a starter. The item will be passed to the RSS Feed at block 780. Next, block 774 determines if another candidate benched player B exists such that the projected points of the next benched player B are greater than the projected points of a starting player S. If another such benched player exists, then control is sent back to block 771 to generate another Lineup Change Suggestion item for the next player B, and the process repeats for each benched player B.

Blocks 775-perform a process similar to blocks 770-774, but for free agent players instead of benched players. Block 775 determines if the projected points of a candidate free agent A are greater than the projected points of a starting player S. If there is no such free agent A, then control passes to block 780. If there is such a free agent A, then block 776 generates a Lineup Change Suggestion item 668 of FIG. 6B. Block 776 also sets the description 676 to "Suggest exchanging starter with free agent". Block 777 then sets the player identifier 674 to identify the players A and S, and sets the type of the GUID 672 to "lineup change suggestion". The client agent 122 of FIG. 5A may, upon receiving the item 668, generate a link to a page for exchanging player A for player S. Block 778 sets the destination address 677 to include the user identifiers of users of teams that have player S as a starter and do not have player A as a starter. The item will be passed to the RSS Feed at block 780. Next, block 779 determines if another free agent exists such that the projected points of the other free agent A are greater than the projected points of a starting player S. If another such free agent exists, then control is sent back to block 776 to generate another Lineup Change Suggestion item referring to the next free agent A, and the process repeats for each such free agent A. After items have been generated for candidate benched players and free agents, block 780 passes any items that were generated in the previous blocks to the RSS Feed 513 of FIG. 5A.

Figure 7E:
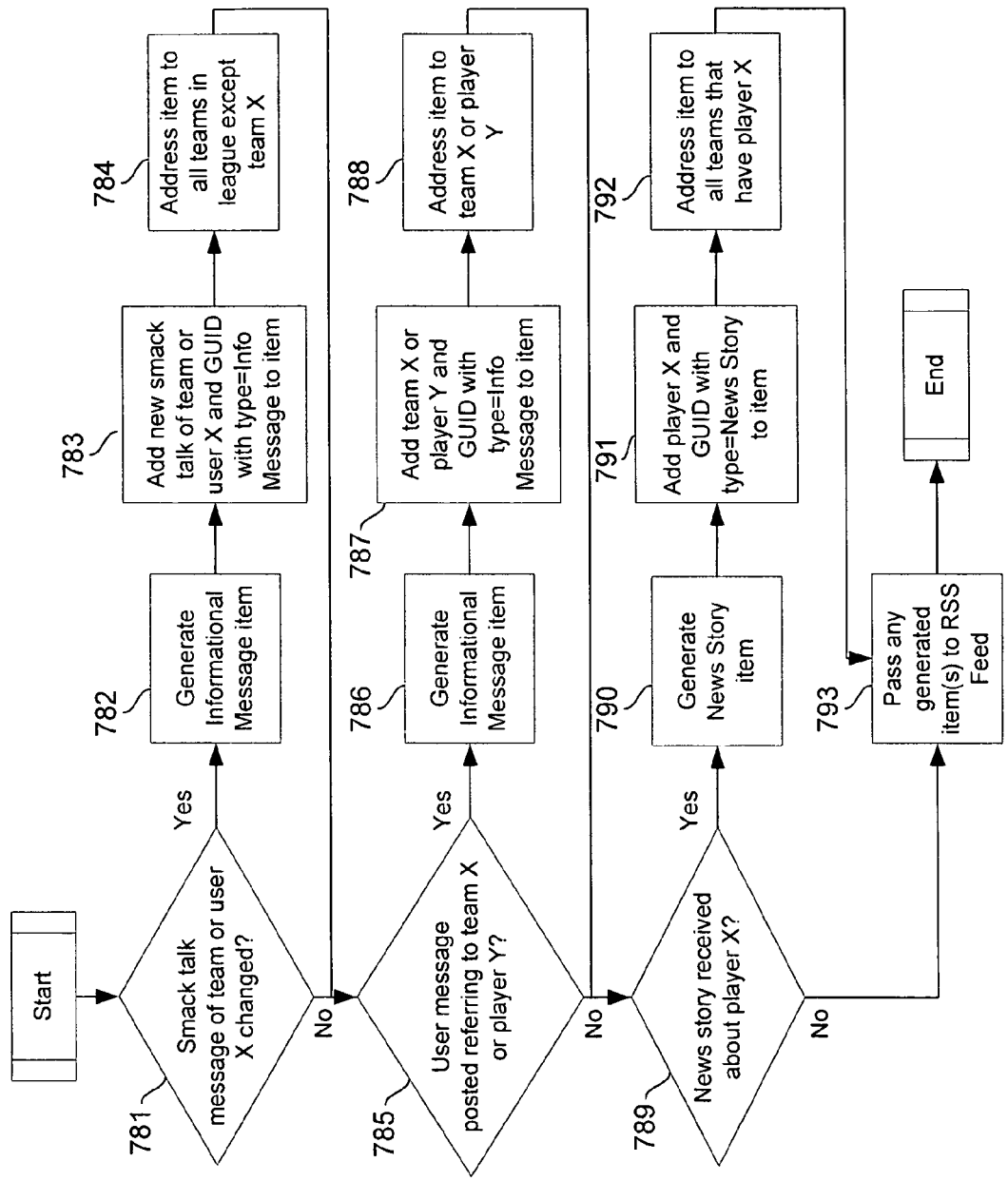

FIG. 7E is an illustrative flowchart of item generation logic for generating news and message items. Block 781 determines if the smack talk message of a team X has changed. If no Smack Talk messages have changed, then control is sent to block 785. If a Smack Talk message has changed, then block 782 generates an Informational Message Item 646 of FIG. 6A. Block 782 also sets the message content 654 to include the content of or a link to the new Smack Talk message. Block 783 sets the type of the GUID 650 to "informational message". Block 784 sets the address 655 to include the user identifiers of all teams except team X. The item will be passed to the RSS Feed at block 793. The client agent 122 may, upon receiving the item 646, display the new Smack Talk message and a link, based upon the GUID 650, for changing the receiving user's own Smack Talk message.

Block 785 determines if a new, i.e., not previously processed, public or user message, which is typically a message posted on a message board by another user, has been posted, and if so, if the message refers to a fantasy sports team X or a player Y. If not, then control passes to block 789. If such as message has been posted, then block 786 generates an Informational Message Item 646 of FIG. 6A. Block 787 sets the message content 676 to the content of the public or user message, and may include in the content 676 any team or player names to which the public or user message is directed. Block 787 also sets the type of the GUID 650 to "informational message". Block 788 sets the address 655 to include the user identifiers of users of all teams X and users of the teams of all players Y mentioned in the public message, or users of all teams in the league in which the message was generated, if the message is not directed to any specific users or teams. The item will be passed to the RSS Feed at block 793.

Block 789 determines if a new, i.e., not previously processed, news story has been received, and, if so, if the new story refers to a team X or a player Y. A news story may be, for example, a story from an online news source, received from the content data feeds 109 of FIG. 5A. If no news story referring to a team or a player has been received, then control transfers to block 793. If a news story referring to a team or a player has been received, then block 790 generates a News Story Item 656 of FIG. 6B. Block 791 then sets the content 664 of the item 656 to include the names of the team X or player Y, which may include multiple teams or players, and the content (or a link to the content) of the news story. Block 791 also sets the type of the GUID link 660 to "news story". Block 791 may also set the player ID 652 of the item 656 to identify one or more players mentioned in the news story. Block 792 sets the address 665 to include the user identifiers of users of all teams X and the users of teams of which all players Y mentioned in the new article are members. Block 793 passes any items generated in the previous blocks to the RSS Feed 513 of FIG. 5A.

Figure 7F:
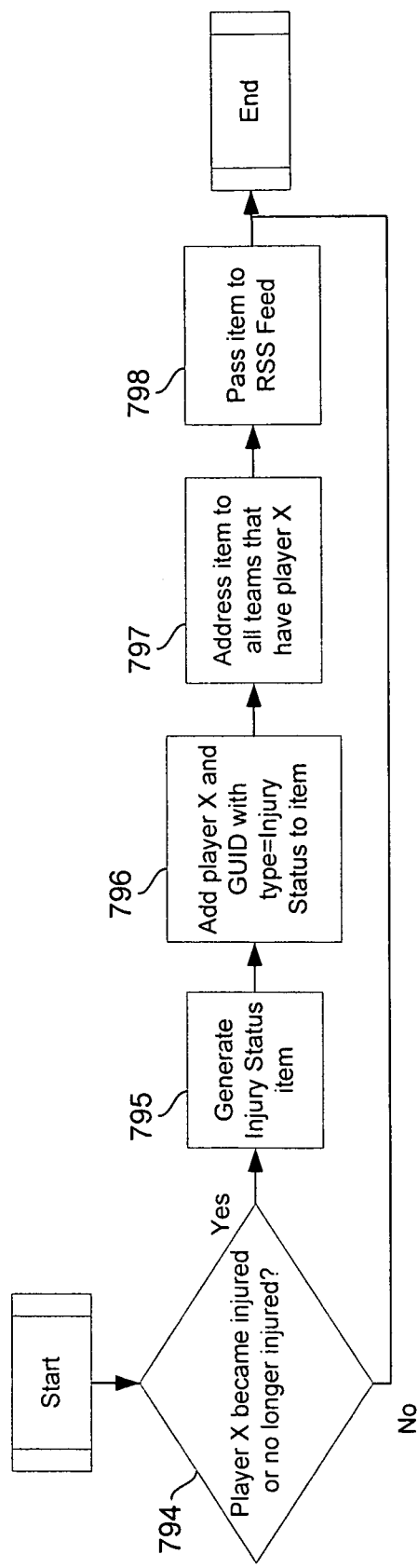

FIG. 7F is an illustrative flowchart of item generation logic for generating an injury status item. Block 794 is invoked if player injury status information is received from the content data feeds 109 of FIG. 5A. Block 794 determines if there has been an injury status change, i.e., if a player X on at least one team has become injured, or if a player who was injured has become no longer injured, based upon real-life injury information received from the content data feeds 109 of FIG. 5A. If there has been an injury status change, then block 795 generates an Injury Status Item 678 of FIG. 6B and sets the item's content 586 to a description of the injury status, e.g., "Player X has been injured and can no longer play in this game". Next, block 796 sets the type of the GUID 682 to "injury status" and sets the player ID 684 to identify the injured (or no longer injured) player, and sets the team ID 685 to identify the player's team. The GUID 682 may be translated by the client agent 122 to a link to a web page provided by, for example, the server 100, with which a user can interact to drop (or add) the player from the user's starting roster. Block 797 then sets the address 687 of the item to include the user identifiers of users of teams that have the player X, and block 797 passes the item to the RSS Feed 513 of FIG. 5A, so that the item will be made available to users of all teams of which the player X is a member.

Figure 8:
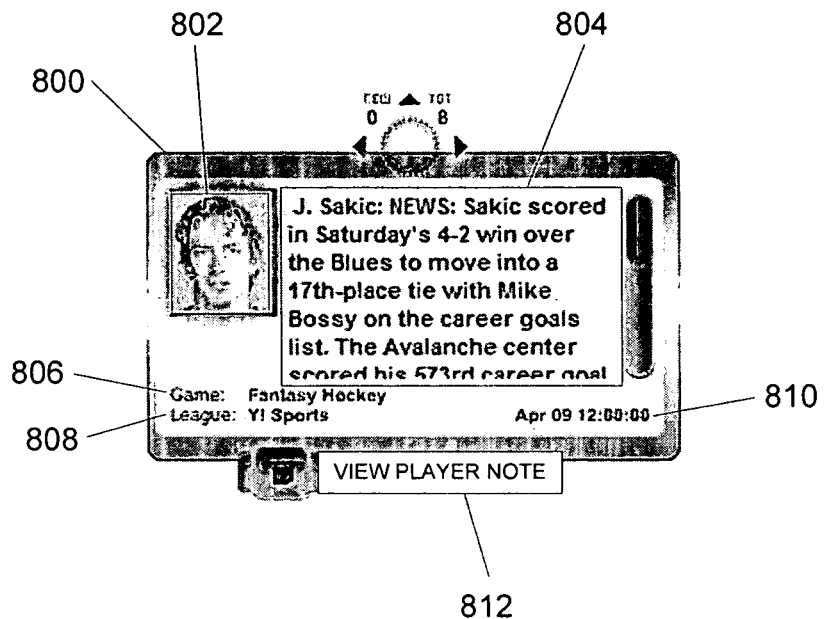
FIG. 8 is an illustrative drawing of a fantasy sports agent user interface widget displaying news in accordance with some embodiments of the invention.

FIG. 8 is an illustrative drawing of a fantasy sports agent user interface widget displaying a news item in accordance with some embodiments of the invention. The user interface widget is herein referred to as a "widget", and is, in this example, a computer program based upon the Yahoo!® Widget Engine™. In other examples, the widget may be based upon other user interface libraries, such as those available in JavaScript™ or Java Swing™. The widget displays a user interface 800, which includes visual representations of the notification 560 of FIG. 5B. In FIG. 8, the notification includes content from the news story item 656 of FIG. 6B. Notifications corresponding to other types of items may also be displayed. With reference to FIG. 5B, the widget user interface 800 displays the notifications 560 which are generated by the client agent 122 from the items 130 received from the item generator 102 of FIG. 1. The widget user interface 800 displays an image 802 and text 804. A game display 806 indicates that the game is Fantasy Hockey, and a league display 808 indicates that the league is "Y! Sports". A date display 810 indicates that the item was generated on April 9th at 12:00. An action bar 812 presents a call to action as, for example, text such as "View Player Note" that describes the call to action. A call to action link such as the call to action link 550 of FIG. 5 is associated with the call to action by a data structure in the fantasy sports agent. A user may click on the action bar 812 to open the call to action link. Opening the call to action link will result in the resource pointed to by the link being opened and displayed, which typically in turn results in the action being performed. For example, for the View Player Note call to action, opening the link will result in display of a player note for the player described in the news story. The action bar 812 may be displayed an area of the screen that can be selected in response to input events, such as by a user clicking a mouse on the area to produce a mouse event. The action bar 812 may also be selectable by keyboard input that produces keyboard events. The client agent may open, i.e., follow, the call to action link as a result of such an input event directed to the action area, i.e., action bar.

Figure 9:
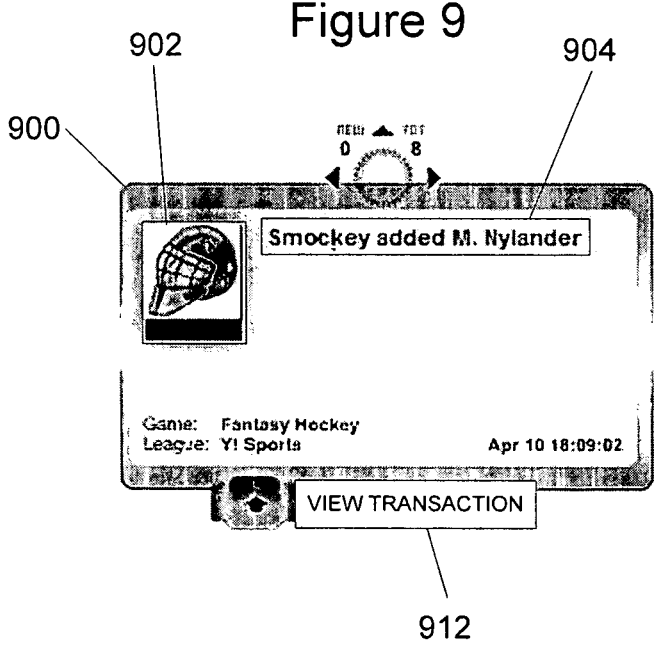
FIG. 9 is an illustrative drawing of a fantasy sports agent user interface widget displaying an add player transaction in accordance with some embodiments of the invention.

FIG. 9 is an illustrative drawing of a fantasy sports agent user interface widget displaying an add player news item in accordance with some embodiments of the invention. A widget user interface 900 displays content associated with an add player transaction event. The content is received as part of an item that describes the transaction. The user interface 900 displays an image 902 which may be, for example, an image associated with a player involved in the transaction, and text content 904, "Smockey added M. Nylander", which describes the add player transaction event. An action bar 912 displays a call to action link with the text "View Transaction". A user may click on or select the action bar 912 to open the call to action link, which will result in display of details related to the add player transaction event.

Figure 10:
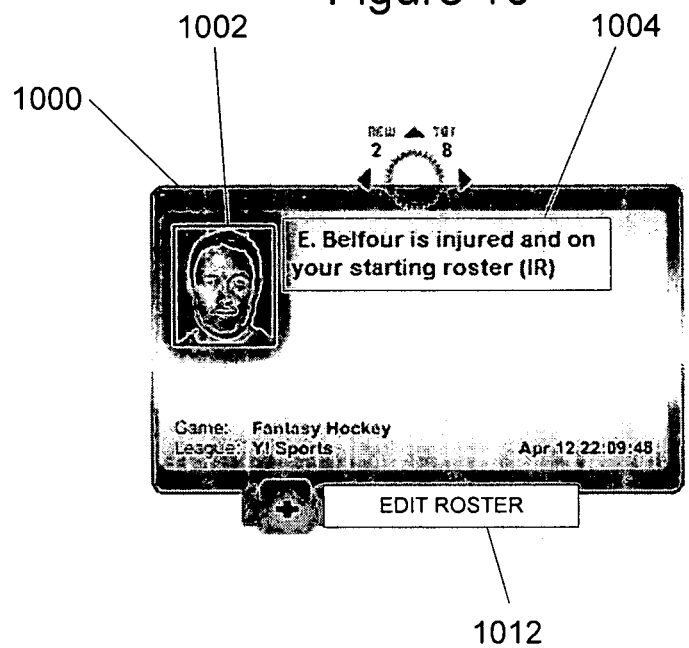
FIG. 10 is an illustrative drawing of a fantasy sports agent user interface widget displaying a starting roster update in accordance with some embodiments of the invention.

FIG. 10 is an illustrative drawing of a fantasy sports agent user interface widget displaying a starting roster update news item in accordance with some embodiments of the invention. A widget user interface 1000 displays content associated with an injury status event. The content is received as part of an item that describes the injury status event. The user interface 1000 displays an image 1002 which may be, for example, an image associated with a player involved in the injury status event, and text content 1004, "E. Belfour is injured and on your starting roster (IR)", which describes the injury status event. An action bar 1012 displays a call to action link with the text "Edit Roster". A user may click on or select the action bar 1012 to open the call to action link, which will result in display of a roster that the user can modify by adding, removing, or rearranging players.

Figure 11:
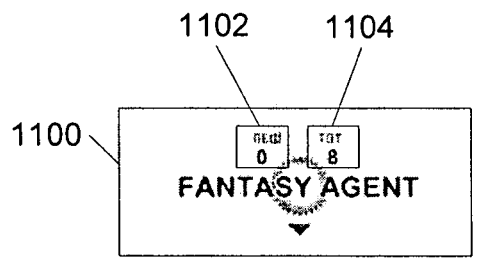
FIG. 11 is an illustrative drawing of a fantasy sports agent user interface widget in a minimized state in accordance with some embodiments of the invention.

FIG. 11 is an illustrative drawing of a fantasy sports agent user interface widget in a minimized state in accordance with some embodiments of the invention. The fantasy sports agent user interface 1100 remains in a minimized state until new, i.e., unviewed, notifications are received. The minimized state allows the agent to remain present on a user's screen without interfering with other applications on the user's screen. When a new notification is received, the agent brings the notification to the user's attention by displaying the notification content in a user interface such as those of FIGS. 8, 9, and 10. In the minimized state, the agent displays a number of new notifications 1102, i.e., a count of the unviewed notifications, and a total number 1104 of notifications, i.e., a count of the viewed and unviewed notifications.

Figure 12:
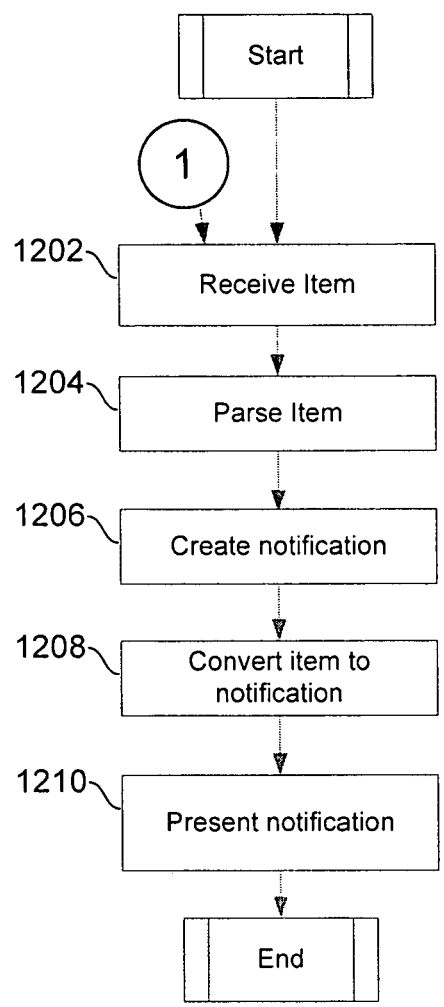
FIG. 12 is an illustrative flowchart of item receiving logic, item parsing logic, and notification logic in accordance with some embodiments of the invention.

FIG. 12 is an illustrative flowchart of item receiving logic, item parsing logic, and notification logic in accordance with some embodiments of the invention. The logic shown in FIG. 12 may be used by a client agent to notify users of events in fantasy sports games. The logic of FIG. 12 begins at block 1202 by receiving an item such as the RSS item 130 from the network 115 of FIG. 1. Block 1202 is labeled with the number 1 to allow this flowchart to be invoked by other flowcharts. Block 1204 parses the item and extracts the individual fields of the item such as the GUID 411 and the description 412 of the example RSS item format 406 shown in FIG. 4. Block 1206 creates a notification, which is, for example, an object in a computer programming language, and block 1208 sets the fields of the notification. In one aspect, bock 1208 sets the fields of the notification format 570 of FIG. 5C to values based upon the fields of the received item 130. For example, the summary field 572 may be set to a summary based upon the item title 410, the URL field 574 to a link generated by link generation logic based upon the GUID field 411, and the description field 576 to the description 412 of the example RSS item format 406. Finally, block 1210 presents the notification, e.g., displays the notification in the user interface 532 of the client agent 122 of FIG. 5B.

FIG. 13 is an illustrative flowchart of notification logic and link generation logic in accordance with some embodiments of the invention. The logic shown in FIG. 13 may be used by a client agent to generate a notification in response to receipt of an item, and to provide a call to action link in the notification. The logic of FIG. 13 does not perform item filtering, and instead relies on the server to only send items that are relevant to the user to whom the notification will be delivered. Since the server performs the filtering for the logic of FIG. 13, the server is a smart server. The logic of FIG. 13 begins by invoking the block referred to by circled number 1, which is block 1202 of FIG. 12, to receive and process an item and present the item as a notification. After the notification has been presented in the user interface, the flowchart of FIG. 13 adds a call to action link to the notification. Alternatively, the flowchart of FIG. 12 could invoke the flowchart of FIG. 13 to add the link to the notification after creating the notification but before presenting the notification.

The link generation logic of FIG. 13 generates an action link to a web page provided by the server 100 of FIG. 1 for performing an action in response to the item. The action link is typically specific to a league, team, and player, so the league identifier, team identifier, and player identifier are extracted from the item to construct the action link. The flowchart of FIG. 13 proceeds at block 1302, which corresponds to the beginning of the notification logic, by retrieving a game identifier, a league identifier, a team identifier, and a player identifier from the item. The server may omit the league identifier or the team identifier from the item (e.g., in the smart client case), in which case the league identifier or team identifier associated with the user may be retrieved from the client's memory storage (i.e., the storage 538 of FIG. 5B). In particular, block 1304 determines if a league identifier was successfully retrieved from the item. If the league identifier was not retrieved, block 1306 retrieves the league identifier from the client's memory storage. Next block 1308 similarly determines if a team identifier was successfully retrieved from the item. If the team identifier was not retrieved, block 1310 retrieves the team identifier from the client's memory storage.

Next, block 1312, which corresponds to the link generation logic, generates an action link by combining a server name with the game identifier, league identifier, player identifier, team identifier, and item type. The link is, for example, a Uniform Resource Locator (URL) for accessing a web page provided by the server 100 of FIG. 5A. Block 1306 may, for example, generate the link using the following statement:

Link='http://fantasysports.yahoo.com/fantasy/1.0/games/'+game+'/leagues/'+league+'/teams/'+team+'/'+type+'/'+player where game, league, team, type, and player are the values of the game identifier, league identifier, team identifier, type, and player identifier, respectively. In some cases, some of the identifiers may be omitted from the action link. For example, if the action is applicable to all players, or is not relevant to a particular player, then the player identifier may be omitted from the action link. Descriptive link text may be displayed in association with, e.g., as a description of, the link URL. For example, the link text may be displayed so that the user may click on the link text to open the web page referred to by the URL. The action bar 812 of FIG. 8 includes the descriptive link text "View Player Note."

FIG. 14 is an illustrative flowchart of notification logic and link generation logic that performs client-side item filtering in accordance with some embodiments of the invention. The logic shown in FIG. 14 may be used by a client agent to provide a call to action link in a notification. The logic of FIG. 14 provides for a smart client configuration in which the client performs filtering to determine if items sent by the server are relevant to the user of the client, so that the client can avoid displaying irrelevant links to the user. In the smart client configuration, the server may send the items to selected clients or to all clients.

The link generation logic of FIG. 14 begins by invoking the block referred to by circled number 1, which is block 1202 of FIG. 12, to receive and process a received item and present the item as a notification. Next, bock 1402, which corresponds to the beginning of the notification logic, retrieves a game identifier and a player identifier from the item. The logic of FIG. 14 is meant to be executed by a smart client, which performs filtering and maintains league identifiers and team identifiers in client memory storage. Therefore, no attempt is made to retrieve the league and team identifiers from the received item. Instead, the league and team identifiers are immediately retrieved from client memory storage by block 1404. Block 1406, which corresponds to the link generation logic, generates an action link by combining the identifiers, as described above with respect to FIG. 13. Next block 1408 invokes item filtering logic to determine if the item is presentable, i.e., relevant, to the user of the client agent. The item filtering logic may be, for example, a subroutine selected based upon the type of the item. For example, if the item type is "add player", then block 1408 would invoke item filtering logic for the "add player" type, which would determine if the item is relevant to that type. If the item filtering logic determines that the item is presentable, then block 1410 passes control to block 1412, which presents the link and descriptive information from the item in the notification generated at the beginning of the flowchart. The link text is displayed in association with the link URL. For example, the link text may be displayed so that the user may click on the link text to open the web page referred to by the URL, as shown by the action bar 812 of FIG. 8, which includes the text "View Player Note". If the item is not presentable, then block 1412 is bypassed and the item is not presented, e.g., not displayed.

FIG. 15 is an illustrative flowchart of item filtering logic for an add player link type in accordance with some embodiments of the invention. The item filtering logic of FIG. 15 is an example of type-specific logic (for the add player type), which may be invoked, i.e., called, by the link generation logic of FIG. 14 to determine if a link is relevant to a user of the client agent. The logic of FIG. 15 referred to a link filtering subroutine and may be module, file, function, or subroutine of computer program code. The item filtering logic of FIG. 15 begins at block 1502 by querying a server to determine if the player represented by the player identifier is available to be added to the user's team, where the player identifier was retrieved from the item. The server may be, for example, a portion of the item generation logic 102 running on the server 100 of FIG. 1. The server may satisfy requests for information about fantasy sports entities such as leagues, teams, and players by consulting the resources 504 of FIG. 5A. Next, if the player is available, block 1504 transfers control to block 1506, which sets a return value or output parameter of the link filtering subroutine to indicate that the link is presentable, e.g., by returning a value such as "true" to the invoking logic. If the player is not available, block 1504 transfers control to block 1508, which sets the return value or output parameter to indicate that the link is presentable, e.g., by returning a value such as "false".

Different item filtering logic may be provided for each item type. For example, item filtering logic for a "drop player" item type would determine if the player to be dropped is on the user's team, instead of determining if the player is available.

FIG. 16 is an illustrative flowchart of suggestion generation logic in accordance with some embodiments of the invention. The logic of FIG. 16 may be used by a client agent to suggest improvements for a fantasy sports team of a user of the client agent, and may be executed, for example, periodically, or in response to the arrival of new game play statistics, or at other times, such as prior to a fantasy sports game, or when a user logs in to a fantasy sports agent. The suggestion generation logic of FIG. 16 begins at block 1602 by retrieving or receiving game play statistics, e.g., information about real-world sports player performance. The game play statistics may be collected by, for example, a statistics monitoring process running on the server 100, such as the statistics monitoring logic 542 of FIG. 5A, or a statistics monitoring process running on the client 120, such as the statistics monitoring logic 552 of FIG. 5B. The statistics monitoring logic may receive the statistics from the data feeds 109 of FIG. 5A.

Next, block 1604 invokes player suggestion logic to generate a suggestion relevant to the user of the client agent, such as a suggestion for adding a player to the user's team. If a suggestion is generated by the invocation in block 1604, then block 1606 transfers control to block 1608 to present the suggestion to the user, e.g., in a user interface, with a description of the suggestion and a call to action link that the user can select to perform the suggested action. A dialog box may be used to ask the user to approve or reject the suggestion. If the user approves of the suggestion or selects the call to action link, then block 1612 submits the suggestion to a server associated with the item generation logic 102 to perform the suggested action, e.g., by adding the suggested player to the user's team in the case of the suggestion for adding a player. Otherwise, if no suggestion is generated, or if the user rejects the suggestion, no further action is taken by the suggestion generation logic.

Figure 17:
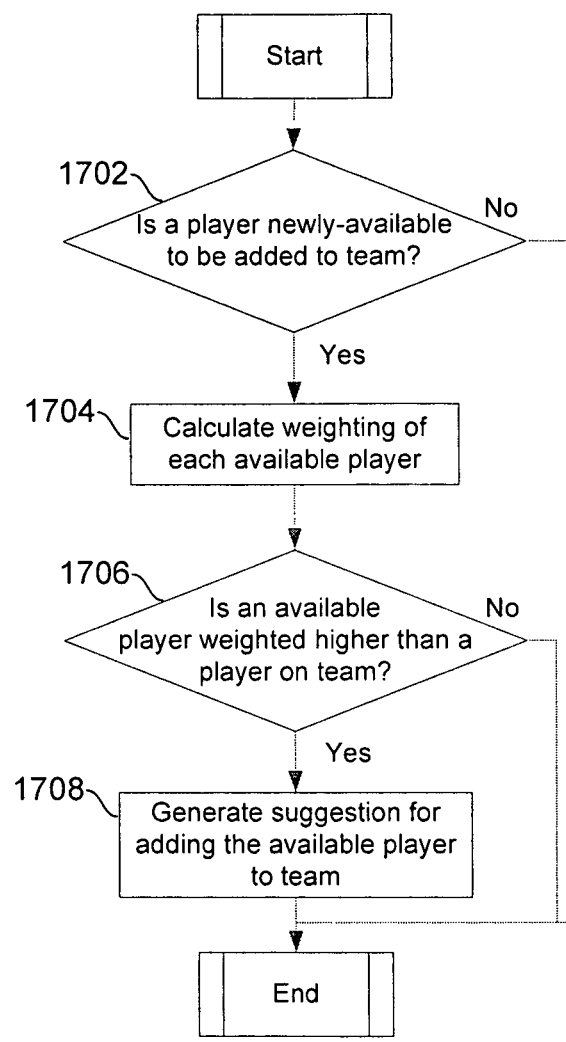
FIG. 17 is an illustrative flowchart of player suggestion logic in accordance with some embodiments of the invention.

FIG. 17 is an illustrative flowchart of player suggestion logic in accordance with some embodiments of the invention. In one example, the logic of FIG. 17 may be invoked by block 1604 of the suggestion generation logic of FIG. 16 to generate suggestions using a player ranking process. The player suggestion logic of FIG. 17 begins at block 1702 by identifying one or more candidate players that have become available to be added to the user's team, i.e., a player whose statistics have changed recently, or who have for some other reason recently become available to be added to the user's team. If at least one candidate player is found, then block 1704 invokes a player ranker process to calculate a weighting value for each candidate player and for each player on the user's team. Such a player ranker process is described in co-assigned U.S. patent application titled "Sports Player Ranker", Ser. No. 11/347,517, the contents of which are incorporated herein by reference in their entirety. In one example, the player ranker system is a subjective or objective ranking system that assigns a numeric ranking to each player, where a higher ranking player is likely to perform better than a lower ranking player. The ranking is used as the weighting value in block 1704. Next, if one or more of the candidate players are weighted, i.e.,  ranked, higher, i.e., greater, than a player that is on the user's team, block 1706 transfers control to block 1708, which generates a suggestion for adding the candidate player(s) to the team. If one or more existing player(s) on the user's team are ranked below any of the candidate players, the suggestion may also suggest dropping the corresponding player(s) from the user's team.

Player rankings may be subjective, e.g., based upon public consensus. Rankings of players may be associated with time periods, e.g., last month or last week. Such seasonal rankings may be used to suggest a player that is ranked higher in the past week or in the past month.

A player may be qualified by a category when comparing player rankings because the rankings may be divided into two or more categories of players for a given position on the teams. In that case, rankings are therefore only compared between similar players, i.e., players in the same category. That is, while a First Baseman not on a team might be ranked higher, i.e., greater, than a Second Baseman (a different position) on the team, but not higher than the team's existing First Baseman, no suggestion would be made, because the higher ranking player is in a different category. In some types of games, such as golf, players may be assigned to categories based upon their performance, and a team may be required to include a certain number of players from each category. In such games, recommendations are only made for players in the same category. In games where players are assigned to positions, such as baseball, basketball, and football, the categories ensure that the highest ranking available player for each position is recommended.

In another example, the player suggestion logic shown in FIG. 17 generates suggestions based upon other metrics, such as buzz list rankings or projected points of players, by modifying block 1704 to calculate the appropriate weighting for the candidate player(s). For example, the weighting may be a buzz list ranking. Buzz list rankings rank players by the amount of "buzz", i.e., news or activity, related to each player. Given two players with two different buzz ratings, the player with the higher buzz rating would have the higher weighting, so suggestions could be generated based upon the buzz rankings of players In another example, the weightings could be projected points values calculated for each player.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

It must also be noted that, as used in this specification and the appended claims, the singular forms "a," "an" and "the" include plural referents unless the context clearly dictates otherwise. Thus, for example, the term "a fantasy sports item" is intended to mean a single sports item or a combination of sports items, and "a player interface feature" is intended to mean one or more player interface features.

The invention can be implemented in any suitable form including hardware, software, firmware or any combination thereof. Different aspects of the invention may be implemented at least partly as computer software or firmware running on one or more data processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

APPENDIX A

```
<item>
    <media:content
url="http://lookup.avatars.yahoo.com/
images?yid=sgrobins&size=medium&type=jpg&pty=3000"
height="48" width="48">nhl-101-63-add_player</media:content>
        <media:title>[add player] Resident F added M. Straka</media:title>
        <media:credit role="provider"></media:credit>
        <media:text><![CDATA[[add player] Resident F
        added M. Straka]]></media:text>
        <title>[add player] Resident F added M. Straka</title>
<link>http://hockey.fantasysports.yahoo.com/hockey/
101/transactions?_y=nhl-101-63-add_player</link>
        <description><![CDATA[<p><a
href="http://hockey.fantasysports.yahoo.com/hockey/
101/transactions?_y=nhl-101-63-add_player"><img
src="http://lookup.avatars.yahoo.com/
images?yid=sgrobins&size=medium&type=jpg&pty=3000"
    width="48" height="48" alt="photo"
title="[add player] Resident F added M. Straka" border="0"></a></
p><p>[add player] Resident F added M. Straka</
p><br clear="all" />]]></description>
        <pubDate>Tue, 14 Feb 2006 15:05:21 PST</pubDate>
        <guid isPermaLink="false">nhl-101-63-add_player</guid>
</item>
```

What is claimed is:

1. A non-transitory computer readable storage medium comprising computer readable instructions tangibly stored thereon for execution by a processor, the computer readable instructions comprising:

in response to an event related to a fantasy sports team or player in a fantasy sports game occurring, receiving, by a fantasy sports client device, an item from a server, wherein the item includes an item type and an item sports identifier, the item sports identifier comprising an item game identifier and an item player identifier, the item comprising a set of data values that represents the event, the event corresponding to an event from a group of events consisting of a change in a roster of the fantasy sports team, a trade of the player between teams, and availability of a relevant news story;

retrieving, by the fantasy sports client device, the item type and the item sports identifier from the received item;

determining, by the fantasy sports client device, an item league identifier based on a user of the fantasy sports client device;

generating, by the fantasy sports client device, an action link, wherein the action link is based upon the item sports identifier and a buzz list, the buzz list comprising a list of a predetermined number of most added players for a predetermined time period with respect to fantasy teams in the fantasy sports game; and presenting, by the fantasy sports client device, a notification to the user, wherein the notification is based upon the item type, the item sports identifier, and the action link.

2. The non-transitory computer readable storage medium of claim 1, wherein the item sports identifier further comprises the item league identifier, an item team identifier, a content field, or a combination thereof.

3. The non-transitory computer readable storage medium of claim 1, further comprising instructions for a user interface widget.

4. The non-transitory computer readable storage medium of claim 1, wherein the item type comprises Add Player, Drop Player, Update Starting Lineup, Update Starting Roster, Incomplete Roster, Roster Changed, Player Trade, Information Message, News Article, Player Injury Status, or a combination thereof.

5. The non-transitory computer readable storage medium of claim 1, wherein the action link comprises a reference to a Web page for performing an action.

6. The non-transitory computer readable storage medium of claim 5, wherein the action link comprises a Uniform Resource Locator for the Web page.

7. The non-transitory computer readable storage medium of claim 1, further comprising instructions for:

causing the notification to be presented to the user if at least one component of the item sports identifier matches a value associated with the user's fantasy sports team.

8. The non-transitory computer readable storage medium of claim 7, further comprising instructions for:

storing a stored sports identifier, wherein the stored sports identifier comprises a user league identifier, a user team identifier, and a user player identifier, and wherein the user league identifier, the user team identifier, and the user player identifier are associated with a user; and providing the stored sports identifier in response to a request that specifies the user.

9. The non-transitory computer readable storage medium of claim 8, wherein presenting the notification to the user comprises presenting the notification to the user if the item player identifier matches a user player identifier associated with a player on the user's team.

10. The non-transitory computer readable storage medium of claim 8, wherein presenting the notification to the user comprises presenting the notification to the user if the item league identifier matches the user league identifier.

11. The non-transitory computer readable storage medium of claim 8, wherein presenting the notification to the user comprises presenting the notification to the user if the item league identifier, the item team identifier, and the item player identifier match the user league identifier, the user team identifier, and the user player identifier, respectively.

12. The non-transitory computer readable storage medium of claim 8, wherein presenting the notification to the user comprises presenting the item to the user if the item is an incomplete roster item and the item team identifier matches the user team identifier.

13. The non-transitory computer readable storage medium of claim 8, wherein presenting the notification to the user comprises presenting the item to the user if the item is a roster changed item and the item league identifier matches the user league identifier.

14. The non-transitory computer readable storage medium of claim 8, wherein presenting the notification to the user comprises presenting the item to the user if the item is a player trade item and the item league identifier matches the user league identifier.

15. The non-transitory computer readable storage medium of claim 8, wherein presenting the notification to the user comprises presenting the item to the user if (a) the item is a lineup change suggestion for adding a player, and (b) the player is available to be added to the user's team, wherein the player is identified by the item player identifier.

16. The non-transitory computer readable storage medium of claim 8, wherein presenting the notification to the user comprises presenting the item to the user if the item is a news story item that refers to a player on the user's team.

17. The non-transitory computer readable storage medium of claim 16, wherein presenting the notification to the user comprises presenting the news story item to the user if a player identified by the item player identifier is a member of a team identified by the user team identifier.

18. The non-transitory computer readable storage medium of claim 8, wherein presenting the notification to the user comprises presenting the item to the user if the item is an injury status item and a player identified by the item player identifier is a member of a team identified by the user team identifier.

19. The non-transitory computer readable storage medium of claim 8, wherein the action link is further based on
the stored sports identifier,
the action link comprising a reference to a Web page for performing an action.

20. The non-transitory computer readable storage medium of claim 19, wherein the action link comprises a link to the Web page, wherein the Web page includes an interface for adding a player specified by the item to the user's fantasy sports team, an interface for dropping the player specified by the item from the user's fantasy sports team, an interface for changing the starting lineup of the user's fantasy sports team, an interface for sending an informational message, or a combination thereof.

21. A non-transitory computer readable storage medium comprising computer readable instructions tangibly stored thereon and for execution by a processor, the instructions comprising:
transmitting, by the processor, a client agent to a fantasy sports client device, the client agent for executing computer instructions comprising:
receiving, by the client agent, game play statistics associated with at least one player and a globally unique identifier (GUID), the GUID comprising a game identifier and a player identifier associated with a fantasy sports game;
determining, by the client agent, a league identifier based on a user of the fantasy sports client device;
generating, by the client agent and for the user, a suggested action by the user upon a fantasy sports team created by the user if a condition is true, wherein the condition is based upon the statistics, upon the user, and upon a buzz list, the buzz list comprising a list of a predetermined number of most added players for a predetermined time period with respect to fantasy teams in the fantasy sports game; and
presenting, on the fantasy sports client device, a representation of the suggested action to the user.

22. The non-transitory computer readable storage medium of claim 21, further comprising instructions for:
submitting the suggestion to a server to perform the suggested action if the user accepts the suggestion.

23. The non-transitory computer readable storage medium of claim 21, further comprising instructions for:
identifying a first player, wherein the first player is available to be added to the user's team;
identifying a second player on the user's team;
determining based upon the statistics a first weighting of the first player and a second weighting of the second player; and
generating a suggestion to add the first player to the user's team if the first weighting is greater than the second weighting.

24. The non-transitory computer readable storage medium of claim 23, wherein the first weighting and the second weighting are based upon player rankings generated by a fantasy sports player ranker.

25. The non-transitory computer readable storage medium of claim 23, wherein the first weighting and the second weighting are based upon positions in the buzz list of the first player and the second player, respectively.

26. The non-transitory computer readable storage medium of claim 23, wherein the first weighting and the second weighting are based upon projected points of the first player and the second player, respectively.

27. A method comprising:
transmitting, by a server computer, a client agent to a client device, the client agent configured to execute computer instructions for:
in response to an event related to a fantasy sports team or player in a fantasy sports game occurring, receiving, by the client agent, an item from the server computer, wherein the item includes an item type and an item sports identifier, the item sports identifier comprising an item game identifier and an item player identifier, the item comprising a set of data values that represents the event, the event corresponding to an event from a group of events consisting of a change in a roster of the fantasy sports team, a trade of the player between teams, and availability of a relevant news story;
determining, by the client agent, an item league identifier based on a user of the computing device;
generating, by the client agent, an action link that refers to a Web page for performing an action,
wherein the action link is based upon the item and a buzz list, the buzz list comprising a list of a predetermined number of most added players for a predetermined time period with respect to fantasy teams in the fantasy sports game; and
presenting, by the client agent, a notification to the user if a condition is true,
wherein the notification comprises the action link.

28. The method of claim 27, wherein the item sports identifier further comprises the item league identifier, an item team identifier, a content field, or a combination thereof.

29. The method of claim 27, wherein the condition is true if at least one component of the item sports identifier matches a value associated with the user's fantasy sports team.

30. A non-transitory computer readable storage medium comprising computer readable instructions tangibly stored thereon and for execution by a processor, the instructions for notifying a user of events in online fantasy sports games, the instructions comprising:
in response to an event related to a fantasy sports team or player in a fantasy sports game occurring, receiving, by a client agent executing on a client device, an item from a server, wherein the item includes an item type and an item sports identifier, the item sports identifier comprising an item game identifier and an item player identifier, the item comprising a set of data values that represents the event, the event corresponding to an event from a group of events consisting of a change in a roster of the fantasy sports team, a trade of the player between teams, and availability of a relevant news story;

determining, by the client agent, an item league identifier based on a user of the computing device;

generating, by the client agent, an action link that refers to a Web page for performing an action, wherein the action link is based upon the item and a buzz list, the buzz list comprising a list of a predetermined number of most added players for a predetermined time period with respect to fantasy teams in the fantasy sports game; and presenting, by the client agent, a notification to the user if a condition is true, wherein the notification comprises the action link.

31. The non-transitory computer readable storage medium of claim 30, wherein the item sports identifier further comprises the item league identifier, an item team identifier, a content field, or a combination thereof.

32. The non-transitory computer readable storage medium of claim 30, wherein the condition is true if at least one component of the item sports identifier matches a value associated with the user's fantasy sports team.

33. A server computer comprising:

a processor;

a storage medium for tangibly storing thereon program logic for execution by the processor, the program logic comprising:

transmitting logic executed by the processor for transmitting a client agent to a fantasy sports client device, the client agent configured to execute computer instructions comprising:

in response to an event related to a fantasy sports team or player in a fantasy sports game occurring, receiving, by the client agent, an item, wherein the item includes an item type and an item sports identifier, the item sports identifier comprising an item game identifier and an item player identifier, the item comprising a set of data values that represents the event, the event corresponding to an event from a group of events consisting of a change in a roster of the fantasy sports team, a trade of the player between teams, and availability of a relevant news story; and retrieving, by the client agent, the item type and the item sports identifier from the received item;

determining, by the client agent, an item league identifier based on a user of the fantasy sports client device;

generating, by the client agent, an action link, wherein the action link is based upon a buzz list, the buzz list comprising a list of a predetermined number of most added players for a predetermined time period with respect to fantasy teams in the fantasy sports game; and presenting, by the client agent, a notification to the user, wherein the notification is based upon the item type, the item sports identifier, and the action link.

* * * * *